United States Patent
Rust

(10) Patent No.: US 10,131,760 B2
(45) Date of Patent: Nov. 20, 2018

(54) STARTER FOR THE DEVULCANISATION OF SCRAP RUBBER

(71) Applicant: Harald Rust, Bochum (DE)

(72) Inventor: Harald Rust, Bochum (DE)

(73) Assignee: Entex Rust & Mitschke GmbH, Bochum (DE)

( * ) Notice: Subject to any disclaimer, the term of this patent is extended or adjusted under 35 U.S.C. 154(b) by 0 days.

(21) Appl. No.: 15/623,599

(22) Filed: Jun. 15, 2017

(65) Prior Publication Data

US 2017/0362407 A1   Dec. 21, 2017

(30) Foreign Application Priority Data

Jun. 16, 2016  (DE) .................. 10 2016 007 290

(51) Int. Cl.
| | |
|---|---|
| *B29B 17/00* | (2006.01) |
| *C08J 11/12* | (2006.01) |
| *B29B 17/04* | (2006.01) |
| *B29C 47/00* | (2006.01) |
| *B29C 47/60* | (2006.01) |
| *C08J 11/04* | (2006.01) |
| *B29K 21/00* | (2006.01) |
| *B29C 47/10* | (2006.01) |
| *B29C 47/42* | (2006.01) |
| *B29K 105/26* | (2006.01) |
| *B29K 105/24* | (2006.01) |

(52) U.S. Cl.
CPC ............... *C08J 11/12* (2013.01); *B29B 17/00* (2013.01); *B29B 17/04* (2013.01); *B29C 47/0004* (2013.01); *B29C 47/6068* (2013.01); *C08J 11/04* (2013.01); *B29C 47/1027* (2013.01); *B29C 47/42* (2013.01); *B29K 2021/00* (2013.01); *B29K 2021/006* (2013.01); *B29K 2105/24* (2013.01); *B29K 2105/26* (2013.01); *C08J 2321/00* (2013.01); *Y02W 30/62* (2015.05); *Y02W 30/68* (2015.05)

(58) Field of Classification Search
USPC ........................................................ 521/45.5
See application file for complete search history.

(56) References Cited

U.S. PATENT DOCUMENTS

| | | |
|---|---|---|
| 3,233,025 A | 2/1966 | Frye et al. |
| 3,642,964 A | 2/1972 | Rausch et al. |
| 4,555,366 A | 11/1985 | Rodgers et al. |
| 5,045,325 A | 9/1991 | Lesko et al. |
| 5,135,760 A | 8/1992 | Degady et al. |
| 5,258,413 A | 11/1993 | Isayev |
| 5,749,189 A | 5/1998 | Oberg |
| 6,831,109 B1 | 12/2004 | Beirakh et al. |
| 7,476,416 B2 | 1/2009 | Tynan et al. |
| 2001/0025060 A1 | 9/2001 | Ohshima et al. |
| 2003/0013776 A1 | 1/2003 | Duin et al. |
| 2004/0033362 A1 | 2/2004 | Mino |
| 2004/0242711 A1 | 12/2004 | Fulford et al. |
| 2010/0160569 A1 | 6/2010 | Meier et al. |
| 2013/0023639 A1 | 1/2013 | Rust |
| 2015/0283728 A1 | 10/2015 | Rust |

FOREIGN PATENT DOCUMENTS

| | | |
|---|---|---|
| DE | 909041 | 4/1954 |
| DE | 1964834 U | 7/1967 |
| DE | 2447368 A1 | 4/1976 |
| DE | 2059570 B2 | 7/1979 |
| DE | 141975 | 6/1980 |
| DE | 3738335 A1 | 5/1988 |
| DE | 69329245 | 3/2001 |
| DE | 69724239 | 9/2003 |
| DE | 60004885 | 10/2003 |
| DE | 60008279 | 3/2004 |
| DE | 69829695 | 5/2005 |
| DE | 102004048440 A1 | 6/2005 |
| DE | 60215210 | 11/2006 |
| DE | 60124269 | 12/2006 |
| DE | 60120804 | 1/2007 |
| DE | 102007041486 A1 | 5/2008 |
| DE | 102007040645 A1 | 3/2009 |
| DE | 102007050466 A1 | 4/2009 |
| DE | 102007058174 A1 | 6/2009 |
| DE | 102008018686 A1 | 10/2009 |
| DE | 102008063036 A1 | 7/2010 |
| DE | 102009013839 A1 | 9/2010 |
| DE | 102009019846 A1 | 11/2010 |
| DE | 102015010460 A1 | 3/2017 |
| EP | 0702739 A1 | 3/1996 |
| EP | 1167017 B1 | 8/2010 |
| WO | 2011091966 A1 | 8/2011 |
| WO | 2014056553 A1 | 4/2014 |

OTHER PUBLICATIONS

An introduction of the planetary roller extruder and areas of applications rubber devulcanization, Authors: Michael W Batton, Thomas J Malzahn, Michael Gerdon, Ralf Quack, Publication data: ANTEC 2015—Proceedings of the Technical Conference & Exhibition, Orlando, Florida, USA, Mar. 23-25, 20150301.

Der Planetwalzenextruder—Ein Vielseitiges Aufbereitungsaggregat, Authors: Limper A, Stehr R, Publication data: Kunststoffe,, Jan. 1, 1990,Carl Hanser Verlag, Munchen, DE, Source info: vol. 80, NR: 1, pp. 26-30.

*Primary Examiner* — Terressa Boykin

(74) *Attorney, Agent, or Firm* — Smartpat PLC

(57) ABSTRACT

A method of devulcanizing crosslinked rubber uses a planetary roller extruder with a central spindle, planetary spindles, a housing, and a feed part. The method includes feeding vulcanized rubber through the feed part into the housing, rotating the central spindle about its rotational axis and thereby causing the planetary spindles to rotate about their rotational axes and revolve about the central spindle. This generates mechanical and thermal stress on the vulcanized rubber by kneading and/or crushing of the vulcanized rubber, breaking or destroying the molecular chains or bonds of the vulcanized rubber. The method further includes at least one of (A) adding particles of the vulcanized rubber eccentrically to the center of the planetary roller extruder module between the planetary spindles and (B) mechanically pressing particles of the vulcanized rubber between the planetary spindles with a crammer feeder.

20 Claims, 14 Drawing Sheets

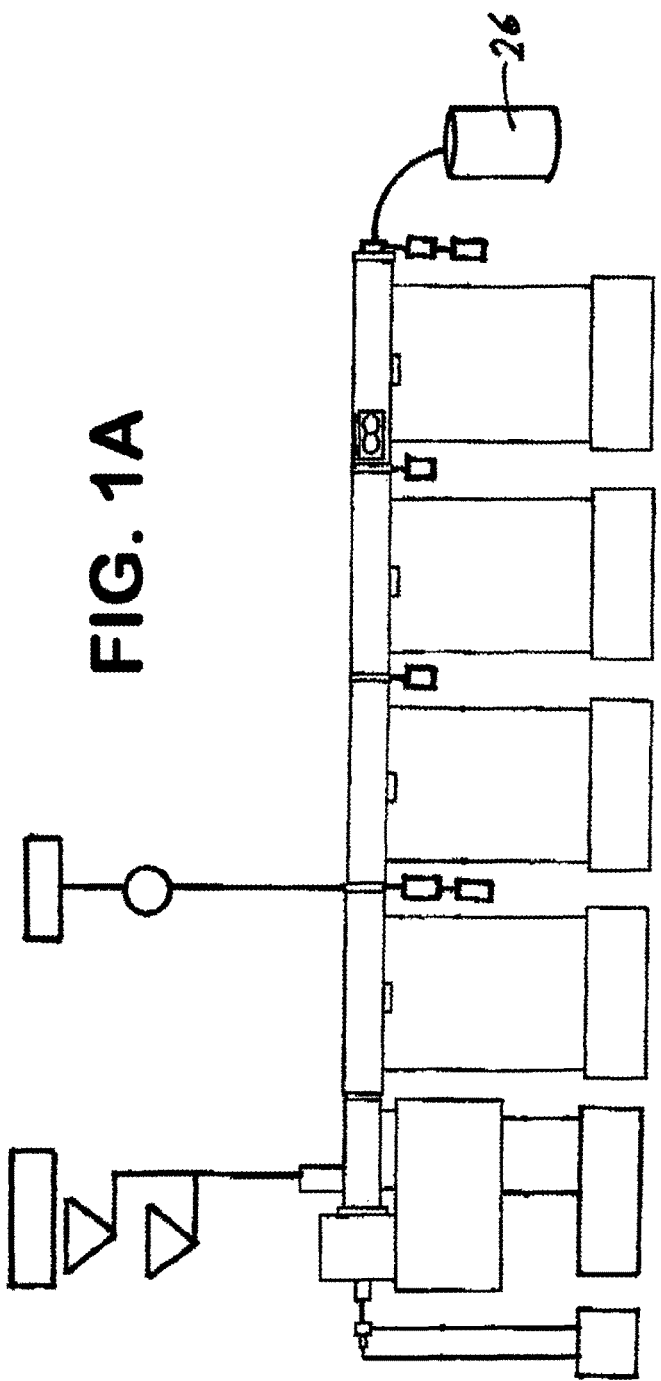

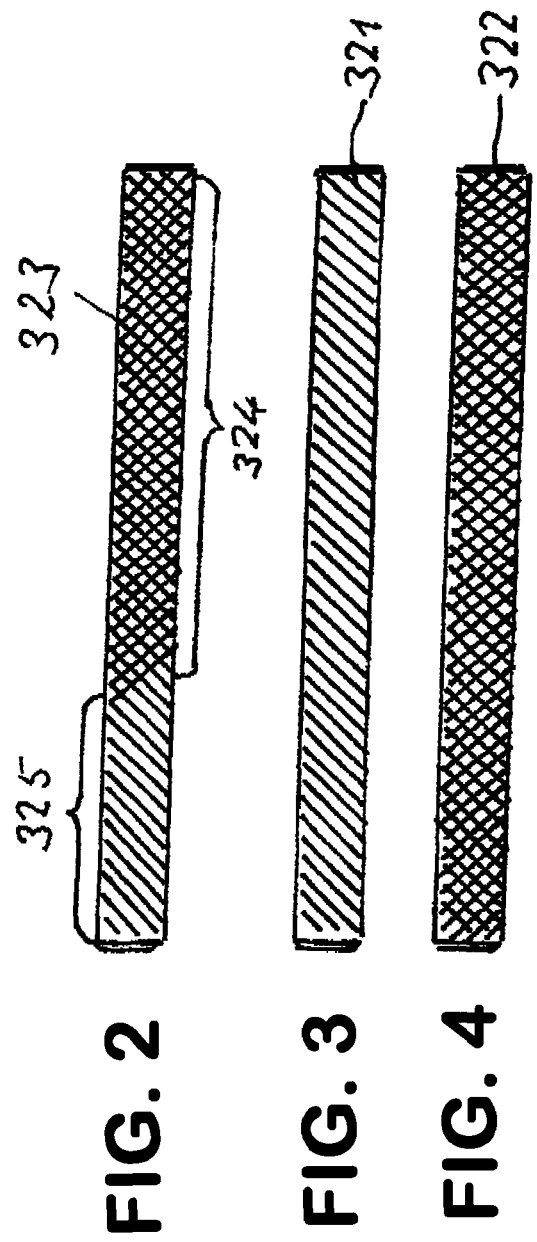

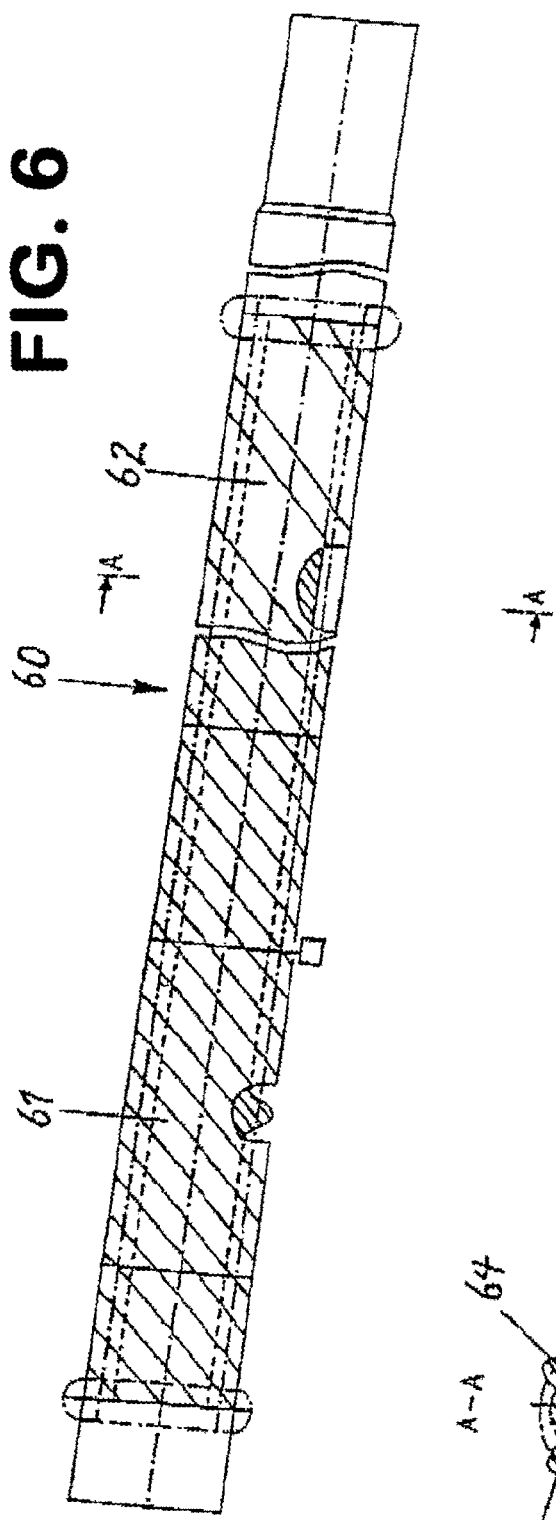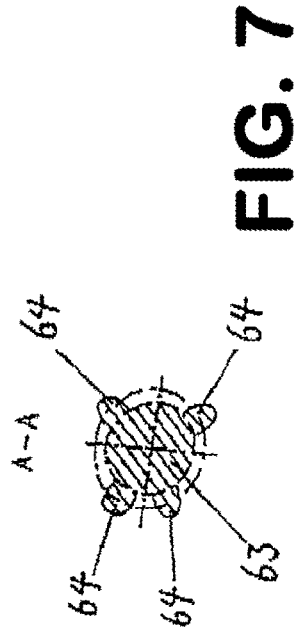

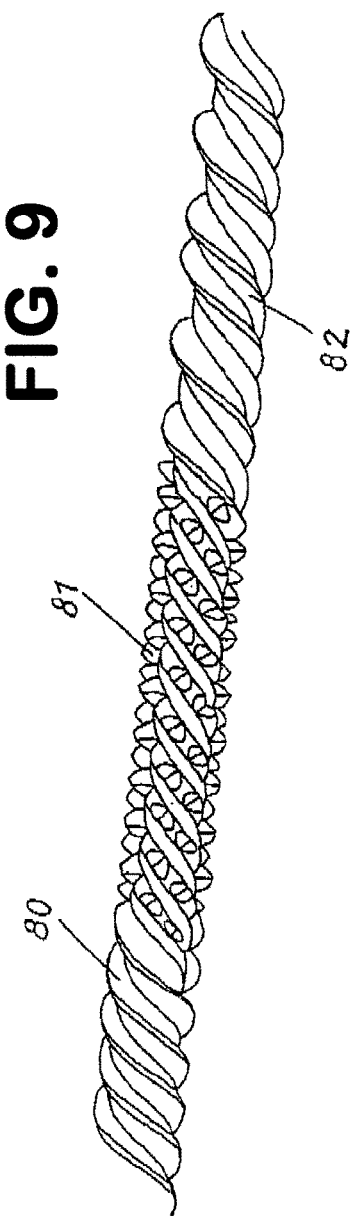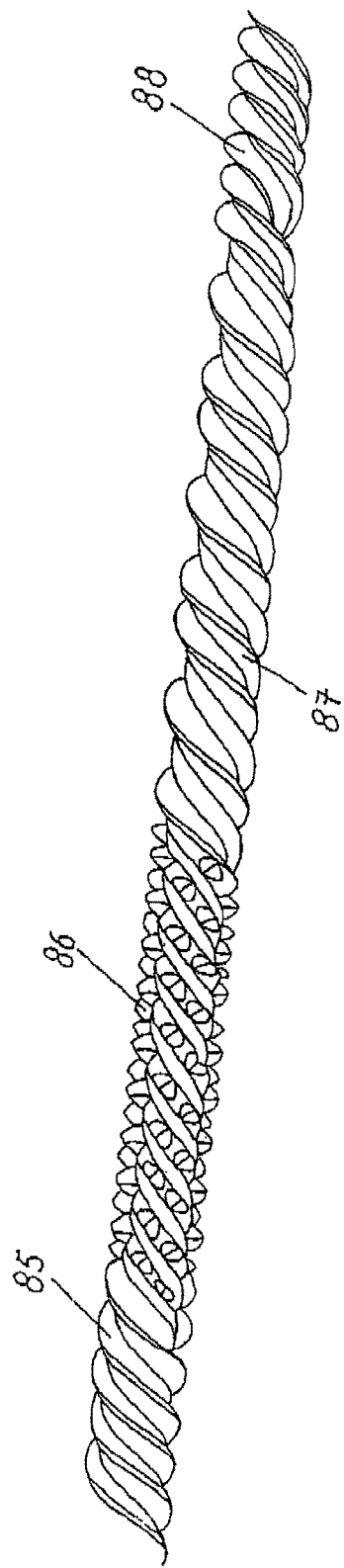

STARTER FOR THE DEVULCANISATION OF SCRAP RUBBER

BACKGROUND

1. Technical Field

The present application relates to the devulcanisation of scrap rubber.

2. Background Information

Background information is for informational purposes only and does not necessarily admit that subsequently mentioned information and publications are prior art.

Rubber comprises natural rubber and/or synthetic elastomers, whose molecules have been subjected to crosslinking. In this regard sulfur-carbon bonds and sulfur-sulfur bonds inter alia between the molecules are known. One may also use the term crosslinked compounds.

Crosslinking drastically modifies the material properties. This may concern the strength, elasticity and the heat deformation resistance.

Rubber is predominantly used in the automobile industry. The toughness of automobile tires is legendary.

The tires are subject to wear as a function of the kilometers driven; the wear can be measured by noting how much of the tire profile has worn away.

If the profile has less than a certain thickness then the tire has to be changed.

Old tires or waste rubber accumulate.

Although various proposals for the chemical reconditioning of waste rubber have been made, the costs are such that up to now hardly any use has occurred. Waste rubber is more often than not probably incinerated. In this regard the cement industry has been a large consumer. The waste rubber is incinerated in rotary furnaces. The cement rotary furnace has a long incineration path, such that non-incinerated gases are post combusted. Any environmental pollution from the non-incinerated gases from waste tires is thus excluded.

However, the cement industry generally demands a waste disposal fee for burning the old tires.

The waste disposal of old tires is moreover no longer regarded as topical.

Consequently much effort has long been spent on recycling rubber and elastomers.

Various approaches have been taken.

Some modifying agents may have been employed for the devulcanisation of crosslinked elastomers and rubber. These modifiers may comprise wholly or partially adipic acid or oxalic acid. Additives that comprise sulfur, zinc oxide and stearic acid have also been used.

Some extracts obtained from oil processing have been proposed as modifiers. These concern for example kerosene, nitrobenzene, furfural, phenol, dichlorodiethylene ether.

Some amine compounds may be proposed as devulcanisation agents/modifiers.

Some aromatic oils, naphthenic oils or paraffinic oils may be proposed as a devulcanisation agent.

2-butanol and carbon dioxide may be proposed as the devulcanisation agent.

Some modifiers have been proposed. Moreover, the oil is itself obtained from the recycle process.

The modifiers have the disadvantage that they remain totally or partially in the recycled product, thereby quite strongly limiting the utilization of the product.

Some processes involve chemical-free devulcanisation.

Microwaves and ultrasound may be used.

The waves generate a high mechanical stress on the rubber and elastomers which is intended to break the molecular chains. The mechanical stress can be complemented by the use of heat or high vapor pressures.

Nonetheless, this type of devulcanisation is regarded as being inadequate.

Other devulcanisation methods are offered.

Crosslinked waste rubber and crosslinked elastomers which are at least partially degradable mechanically and/or thermally are devulcanised by means of extruders. For example, waste rubber and elastomers that are crosslinked with sulfur compounds are intended to be devulcanised. The sulfur is liberated by mechanical and thermal stressing and separated from the rubber or elastomers.

A planetary roller extruder is used.

Some single-screw extruders and twin-screw extruders may be employed to generate mechanical stress, by which the molecular backbones can be broken.

Planetary roller extruders, in comparison to twin-screw extruders, are seen to produce a far lower mechanical stress on the molecular backbone.

Even if planetary roller extruders are mentioned in some publications as possible extruder variants, up to now planetary roller extruders have not yet been integrated into production units for recycling rubber and elastomers. In line with the low expectation for the mechanical stressing of molecule chains by planetary roller extruders, some indications of the use of planetary roller extruders for regenerating rubber are linked together with the instruction to add abovementioned devulcanisation agents.

Nonetheless, an adequate mechanical action for devulcanisation is generated in planetary roller extruders equipped with dispersion rings. With the dispersion rings the cross section of the passage for the rubber or elastomer in the extruder is reduced more than by a thrust ring. Thrust rings usually have an inner diameter that is about equal to the diameter described by the rotation of the central axes of the planetary spindles. Various designs of thrust rings also have a larger inner diameter.

The inner diameter of the provided dispersion ring may be: at least ten percent, at least twenty percent, or at least thirty percent of the dimension of the associated planetary spindles less than the above described diameter of the motion path of the planetary spindle centers as they revolve.

The reduction can go so far in this respect that the dispersion rings enclose the central spindle with a small gap that is slightly more than the clearance needed and/or required for rotation of the central spindle.

The cross section of the passage can even be reduced to such an extent that the dispersion ring engages into a groove of the central spindle.

In this regard the dispersion ring may for example even leave open a gap of a few millimeters, in the extreme case for example of one millimeter, to the tooth base for the passage of the rubber and elastomers.

In this regard it may be possible to machine the groove further into the central spindle to a slight degree, for example one millimeter, past the tooth base of the toothing on the central spindle. Such rings are for example designed in several parts, such that the rings can be assembled around the central spindle and engage in the groove, when the planetary roller extruder or planetary roller module is prepared for the installation of the dispersion ring.

The process for processing scrap rubber is for example employed when the rubber has been separated from the metallic reinforcing interlayers. Metallic reinforcing interlayers are found for example in scrap tires. They concern steel inserts that maintain the shape of the vehicle tires.

Various process are suitable for separating rubber and metal.

The waste rubber is optionally strongly cooled and in the highly cooled state comminuted in a mill. When in the cooled state the comminution is easier because the resilience of the rubber is reduced. The colder the rubber, the easier is the comminution.

Rubber and elastomers may be fed as chips into the extruder. The average diameter of the chips may be five millimeters to forty millimeters, or may be fifteen millimeters to thirty millimeters.

The temperature of the material processed in the planetary roller extruder can be controlled very well because the processed material or rubber and elastomers is rolled out with a large surface area and very thinly. The planetary roller extruder acts as a large surface area heat exchanger. Single-screw and twin-screw extruders of a comparable size possess a comparatively small heat exchange surface.

Planetary roller extruders possess a centrally arranged, driven central spindle. The exterior of the central spindle is usually provided with involute toothing. Other types of toothing may also be used. The involute toothing usually has a forty-five degree taper of the teeth. Different sizes of teeth also may be used. Differentiation is made according to tooth modules.

The central spindle is surrounded by a housing that possesses an inner toothing. The inner toothing has the same tooth module as the external toothing on the central spindle.

A plurality of planetary spindles are arranged on the circumference of the central spindle between the housing and the central spindle. The planetary spindles possess an external toothing with the same module as the central spindle and the housing toothing. The planetary spindles mesh with the central spindle and with the inner toothing of the housing.

The rotating planetary spindles slide forwards in the machine direction on a slide ring or thrust ring, such that their orbit is defined in the axial direction.

In the planetary roller extruder the feedstock is rolled in a thin layer between the inter-meshing teeth. This produces a strong kneading action on the waste rubber. Heat is transferred into the waste rubber due to the kneading action. The generated heat is used as needed and/or desired to heat up the feedstock or is carried out of the extruder by cooling.

The kneading action can be influenced by different numbers and/or different designs of the planetary spindles.

The number of planetary spindles may be at least five or may be at least six. The greater the diameter of the central spindle, the more planetary spindles are usually provided in a module/section. Thus, for example, with larger sizes twenty-four and more spindles can be readily employed.

The planetary spindles can be designed for example as conventional spindles, as transversal mixing spindles or back-cut spindles. The conventional spindle has the same toothing continually or substantially continually from one end to the other.

The transversal mixing spindle is derived from the conventional spindle. Circular circumferential recesses are worked intermittently into the toothing in the transversal mixing spindle, such that, as viewed from the side of a spindle, one can perceive a meandering contour.

The back-cut spindle is also derived from the conventional spindle. Here, however, the conventionally toothed spindle is equipped with a contrary-running toothing that crosses the normal toothing. This means that gaps of a certain shape and sequence are cut into the teeth of the conventional toothing with the contrary-running toothing. The remaining teeth of the conventional toothing are stud-shaped. The gaps reduce the conveying action of the planetary spindles, whereas the kneading action increases. Moreover, the kneading with the studs differs from the kneading with the conventional spindle and the transversal mixing spindle.

The cited published texts on the transversal mixing spindles and back-cut spindles describe further useful details on planetary roller extruders that are suitable for devulcanisation.

The temperature of the processed material is brought to the desired level for devulcanisation in the planetary roller extruder by supplying heat or by cooling.

This level may be between 250 and 350 degrees Celsius, or my be between 250 and 300 degrees Celsius.

The kneading action and the thermal action are maintained for one to four minutes, or one and one-half to three minutes. This duration corresponds to the residence time in the planetary roller extruder.

The sulfur bonds are broken apart by kneading and heating the scrap rubber in the planetary roller extruder. The sulfur is converted into the gaseous state. The gas is suctioned off. In extrusion this is called degassing.

The correct material-dependent kneading action and temperatures can be determined from the results of a few tests, in which the residence time and the temperature are modified.

A successful devulcanisation of rubber and elastomers under appropriate conditions of processing time/residence time yields a fluffy material of low strength.

If the temperature is too high the processed material/feedstock may be seen to be overheated, for example scorched.

If the temperature is too low the de-crosslinking will not be sufficiently accomplished; the extruded material, although flexible, will still exhibit at least to some extent a degree of strength.

The planetary roller extruder may be suitable for the desired heating of scrap rubber, when the inner side of the housing has a liner that on the central spindle-side is equipped with the described internal toothing and on the outside is equipped with an identical or substantially identical conventional toothing or another conventional toothing. The liner may be shrunk into the housing. For this the liner is cooled so that its diameter is sufficiently reduced to allow it to be pushed into the housing. When reheated the liner expands and becomes firmly seated in the housing. The housing may also be shrunk onto the liner. In this case the housing is heated and expands, such that the liner can be pushed into it. As it cools down, the housing firmly encloses the liner.

In both shrinking procedures, the housing locks the flights of the external toothing on the liner. In this way the flights are utilized as channels for the passage of temperature control media.

The channels are for example connected together on the housing ends by an annular channel. One annular channel is provided on the feed side and connected to a supply line. The other channel is provided on the discharge side and connected to a discharge line. Both lines are components of a temperature control means. Oil is used as the temperature control medium for the devulcanisation.

The oil is pumped through the channels.

Depending on the oil temperature this causes cooling or heating.

Depending on the material properties of the scrap rubber one extruder can be used if it is long enough to accomplish the total devulcanisation in one extruder. This means that the extruder is long enough to achieve the desired residence time.

However, extruders are used that are composed of flush jointed modules/sections. Each module possesses its own housing, own planetary spindle and own thrust ring.

A common central spindle may be provided for the flush jointed modules/sections.

The optional overall or partial length of the modules/sections may be less than/equal to 800 millimeters, less than/equal to 600 millimeters, or less than/equal to 500 millimeters.

Shorter lengths of the individual or of all modules/sections may allow different temperature requirements to be met. Moreover, the temperature control on a longer extruder module/extruder section can also be sub-divided into various sections that lay axially one behind the other.

However, module lengths of more than 1000 millimeters, for example 1400 millimeters, may also be used.

In general, the greater the diameter of the extruder, the greater the output. An increased output may require and/or desire a longer residence time of the rubber and elastomers in the extruder and require and/or desire a greater extruder length.

The modular construction/sectional construction also allows the kneading action of the planetary roller extruder to be altered by altering the toothing or by mounting modules with different toothing.

Insofar as identical modules are already provided an alteration of the kneading action and the residence time can still be achieved afterwards by changing the planetary spindles or by reducing the number of planetary spindles.

This is a substantial practical advantage when the feedstock is changed.

In this context, back-cut spindles can be combined with conventional spindles and/or with transversal mixing spindles. The back-cut spindles represent the one extreme for the processing of rubber in the extruder; the effect of transversal mixing spindles and conventional spindles diverges from this. If it appears that the residence time is too long, then single or more back-cut spindles may be exchanged by transversal mixing spindles or conventional spindles. Transport spindles may optionally also be used to shorten the residence time. This means that one or more back-cut spindles are replaced by transport spindles.

The transport spindles are likewise derived from the conventional spindles. For this, one or more teeth are milled out of the conventional toothing of the spindle.

For processing rubber or the like different lengths of the planetary spindles are also advantageous, such that the material fed into planetary roller module is gently and not abruptly seized by the toothing.

The application of one possible process afforded a successful devulcanisation of scrap rubber. The equipment used is composed of a feed part and various planetary roller modules.

Some process may be based on the consideration that the heating provided to heat the feedstock after it has left the feed part up to the start temperature for the devulcanisation is separated from the devulcanisation.

A dispersion ring may be used for the heating zone. This ring contributes to the mechanical processing of the feedstock. Moreover, the dispersion ring homogenizes the material flow into the heating zone. This facilitates the control of the heating.

In some processes, the devulcanisation zone is the zone, in which:

after the homogenization by a dispersion ring under concomitant mechanical processing of the scrap rubber in the planetary roller extruder the material is degassed.

Moreover, it is possible to sub-divide the devulcanisation zone into a start phase and into the phase for further devulcanisation.

The sulfur that is released by breaking up the molecular crosslinks has to be or should be at least largely discharged from the extruder in order to obtain a raw material of sufficient quality.

The separation of the heating zone from the devulcanisation zone is achieved by the modular design of the planetary roller extruder, wherein the heating zone is associated with a distinct planetary roller module having a separate temperature control (cooling/heating).

In the extreme case the devulcanisation can take place in a single planetary roller module. However, a plurality of planetary roller modules, each with separate temperature control (cooling/heating) are used. Moreover, it is possible to provide a separate planetary roller module with its own/separate temperature control (cooling/heating) for the start phase and for the heating zone.

The dispersion ring at the beginning of the devulcanisation zone is for example located between the heating module and the first module of the devulcanisation zone.

Optionally, at least one additional dispersion ring may be used in the devulcanisation zone at a distance from the first dispersion ring, in order to build up additional mechanical stress. As at the first dispersion ring the feedstock is mechanically stressed at the second dispersion ring by forcing the feedstock through a narrow slit passage on the dispersion ring.

The slit passage on a dispersion ring is selected as a function of the relevant characteristics of the feedstock. For a powdered feedstock a very narrow slit and long slit is chosen, which imperatively leads to the desired deformation and the thereby associated mechanical stress. The same applies for a fine-grained feedstock. With coarse material a relatively larger and shorter slit leads to the desired deformation and the thereby associated mechanical stress. It is aimed to process materials that are as coarse as possible. That unburdens the preparation of the scrap rubber for the processing in the planetary roller extruder. This means that scrap rubber is for example shredded and/or milled down to a coarse granularity. This requires less work, effort and costs than shredding and milling to a fine granularity. Savings are very high in comparison to a powder form.

The characteristics of the feedstock are modified after homogenization by the first dispersion ring and processing in the associated planetary roller extruder section. Rubber and elastomers become more resilient. This is taken into account for the choice of the next dispersion ring. The slit width and slit length of the dispersion rings is discussed below. This is understood to mean the opening between the dispersion ring and central spindle.

At a constant or substantially constant temperature dispersion rings may be chosen with a slit width that decreases as the processing path increases and/or with a slit length that increases as the processing path increases. The processing path is the path along which the feedstock/treated material is processed. The processing path becomes greater the more planetary roller extruders are combined/employed together to form an extrusion unit.

For example, extruder units can result, in which the opening width of the second dispersion ring compared to the opening width of the first dispersion ring is at least five percent, at least ten percent, or at least fifteen percent less, of the third dispersion ring compared to the opening width of the second dispersion ring is at least five percent, at least ten percent, at least fifteen percent, or at least twenty percent smaller, of the third dispersion ring compared to the opening width of the second dispersion ring is at least five percent, at least ten percent, at least fifteen, or at least twenty percent smaller, of the fourth dispersion ring compared to the opening width of the third dispersion ring is at least five, at least ten percent, at least fifteen percent or at least twenty percent smaller.

In this regard, based on the construction size, the first dispersion ring for example can have the following slit widths:

| Construction size | Slit width |
| --- | --- |
| 50 mm | 4.5 mm |
| 70 mm | 4.5 mm |
| 100 mm | 7 mm |
| 150 mm | 7 mm |
| 180 mm | 9 mm |
| 200 mm | 8.5 mm |
| 250 mm | 8 mm |
| 280 mm | 13 mm |
| 300 mm | 16 mm |
| 350 mm | 16 mm |
| 400 mm | 17 mm |

The slit width/opening width of the slit on the dispersion ring refers to the gap between the external surface of the central spindle and opposite inner surface of the dispersion ring at the place in question.

The length of the slit of the dispersion rings depends on their thickness. The thickness can be for example one to twenty-five millimeters or can be three to twenty millimeters.

A modifiable slit length is advantageous. In case of doubt the slit length can be changed by exchanging one dispersion ring for another with a greater or smaller thickness. However, this may simultaneously force the central spindle to be exchanged. The central spindle is advantageously left unchanged. For this the exchangeable dispersion rings can be equipped on the housing side with a collar of constant or substantially constant thickness and on the central spindle side with a flange that is optionally thicker or thinner.

The design with the thicker collar and thinner flange allow the dispersion ring to be composed of two or more segments that are put together around the central spindle and thereby engage with the flange into a groove or undercut of the central spindle.

In the region of the slit the dispersion rings can be exactly or substantially exactly cylindrical. The dispersion rings may be rounded on the flanges on the surface that forms the slit and equipped with a streamlined conicity, such that no deadzones are formed in the slit. The dispersion rings optionally have an entry cone and an outlet cone. The outlet cone can be longer than the entry cone.

The conical surfaces of the dispersion rings may be at an angle of one degree to forty-five degrees, may be at an angle of ten degrees to thirty-five degrees, and/or may be at an angle of fifteen degrees to thirty degrees to the central axis of the dispersion rings.

The surfaces of the undercut also belong to the surfaces formed by the slits. To avoid dead spaces the edges and corners of the undercut are also rounded. Dead spaces are spaces in which material can be deposited without being flushed away by inflowing material.

The undercut in the central spindle remains unchanged, and changes are made to the slit, for example by its enlargement or reduction, and other shaping is made by changing the dispersion ring.

The deformability of the feedstock can be advantageously influenced by the temperature control of the extruder. Heating increases the deformability, cooling decreases the deformability. This can also be utilized in order to employ dispersion rings with a slit width or slit length which at other temperatures of the feedstock afford unsatisfactory processing of the feedstock.

With the modular design of the extrusion unit the dispersion rings can be arranged between each of the two planetary roller modules and/or between a module formed from the feed part and from a type of single screw and a subsequent planetary roller module.

This facilitates the mounting and exchange of the dispersion rings, such that the dispersion rings can be matched to the relevant feedstock and to the relevant processing state in the unit. This applies to dispersion rings that do not engage into a groove of the central spindle.

However, for dispersion rings that do engage into a groove of the central spindle it may also be possible to exchange dispersion rings having a different slit length, without having to exchange the central spindle, as long as the groove can be retained.

The placement between two modules enables the dispersion rings to be clamped as the associated module housing ends are being clamped. This advantage is also usually exploited to mount the thrust rings that belong to a planetary roller module.

The thrust rings and the dispersion rings may be integrated in a common construction when the dispersion rings for example are inserted between two planetary roller modules. The common construction can be a centering ring, into which the thrust rings and the dispersion rings are inserted. When the housing is clamped, for example, the housing of the rear module in the direction of flow can press against the dispersion ring, the dispersion ring can press against the thrust ring and the thrust ring can press against the housing of the downstream front module. At the same time these machine parts are centered, in that the centering ring is centered in the housing of the front module, the thrust ring and the dispersion ring is centered in the centering ring, and the housing of the rear module in the direction of flow is centered on the dispersion ring, because the dispersion ring protrudes somewhat against the centering ring and the protruding end is enclosed by the housing of the rear module.

The advantage of the arrangement of the dispersion rings between two neighboring planetary roller modules or between a feed module designed as a type of single screw and a planetary roller module can be so great that the module length is geared to the desired position of the dispersion rings.

Incidentally, by using central spindles that are similarly of a modular design a partial exchange of the central spindle can take place for increasing slit lengths. The exchange is then limited to the spindle part in question or the slit modification associated with the exchange of the spindle part in question complements the slit formation associated with an exchange of the dispersion ring.

In the modular design a central spindle often comprises a central shaft, on which are slid toothed sleeves that are themselves modules of the central spindle. The sleeves are braced against each other with the shaft. Moreover, a tongue and groove connection can be provided between the shaft and the sleeves. The torque needed and/or desired to move the central spindle is transferred through the shaft onto the sleeves.

The torque is usually generated with a drive motor and transferred through a gear onto the central spindle.

Moreover, it is possible to interlock the various sleeves with a type of toothed coupling, such that the required and/or desired torque can be directly transferred from the gear onto the sleeves. One sleeve imparts the torque to the other sleeve.

The sleeves, on the external circumference, carry the required and/or desired toothing for cooperating with the planetary spindles in a planetary roller extruder or planetary roller module.

Insofar as a groove for a dispersion ring is provided in the central spindle then the groove can be formed by an externally wholly or partially smooth sleeve/central spindle module. To change the groove that corresponds to a dispersion ring another matching module can be exchanged for an existing central spindle module.

Degassing is carried out possibly by means of a side arm extruder, wherein the side arm extruder utilized for degassing still may sit perpendicularly or substantially perpendicularly to the planetary roller extruder or to its associated planetary roller module.

To continue the devulcanisation it is advantageous if an additional degassing is provided after each additional dispersion ring. The additional degassing may also be carried out again through side arm extruders. In addition, degassing may be carried out at the extruder outlet. In this case an additional dispersion ring and gas suction are provided at the extruder outlet. Gas suction at the extruder outlet is very effective, because the gas, due to its heat, expands, is released from the feedstock and bubbles up.

The use of side arm extruders for degassing allows the gas to be suctioned off very well. This occurs at a short distance from the dispersion ring that is upstream of the module in question. The largest cavity is formed there with the specified partial filling of the module.

If a unit has four planetary roller modules there results with the separate heating phase and the separate start phase a total of five planetary roller modules. This may result in a greater total length, however, the total length of the unit may not essentially differ from the length of a unit. The modules for the heating zone and for the start phase together should not be longer than a planetary roller module. Some modules also include a greater total length or a shorter total length.

The modules for the heating zone and the start phase can optionally have the same length.

The following preferred lengths are shown as a function of the construction size of the planetary roller extruders/modules

| Construction size | Module length Heating zone | Module length Start phase |
|---|---|---|
| 50 bis 70 | 100 to 300 mm | 100 to 300 mm |
| 100 to 150 | 250 to 600 mm | 250 to 600 mm |
| 170 to 250 | 300 to 650 mm | 300 to 650 mm |
| 280 to 300 (heavy design) | 320 to 800 mm | 320 to 800 mm |
| 350 | 300 to 650 mm | 300 to 650 mm |
| 400 (heavy design) | 320 to 800 mm | 120 to 800 mm |
| 400 | 320 to 800 mm | 320 to 800 mm |
| 500 to 1000 | 350 to 1000 mm | 350 to 1000 mm |
| 500 to 1000 heavy design | 350 to 1000 mm | 350 to 1000 mm |

The construction size corresponds to the reference diameter of the inner toothing in the housing or in the housing liner.

The energy needed and/or required for the start of the devulcanisation is supplied in the heating zone. This is supplied by the mechanical processing in the heating zone and by heating the heating zone. The higher the energy introduced into the feedstock by mechanical processing the less energy needs to be supplied or is desired by heating and vice versa. The greater the heating the lower the required and/or desired mechanical processing. Strongly heating with a temperature control agent at a temperature higher than 300 degrees Celsius with a lower rotational speed of the central spindle is possible. A temperature of more than 320 degrees Celsius may be desired there. A temperature of more than 340 degrees Celsius may be provided. The temperature of the heating agent can also be between 350 and 400 degrees Celsius. As a result of the short residence time of the feedstock in the heating zone and as a result of the intensive mixing of the material in the heating zone and the thereby associated energy input the feedstock is thus heated very rapidly to the start temperature for the devulcanisation. The start temperature is material-dependent and is appropriately determined in the laboratory. The start temperature can also be ascertained in the unit, in that a temperature is set that is certainly in the starting region and the temperature is then lowered until the discharged devulcanised material attains the desired quality The start temperature may be below 300 degrees Celsius and the temperature in additional parts of the devulcanisation zone is not raised above the start temperature. The temperature in the additional parts of the devulcanisation zone may be lower than the start temperature. In this regard it may be appropriate to reduce the temperature from planetary roller module to planetary roller module in order to maintain the viscosity of the feedstock at the same level during the devulcanisation. The viscosity may also be modified by changing the cooling and the heating as needed and/or required. With a constant or substantially constant viscosity of the feedstock the same dispersion rings may be used in planetary roller modules provided in the devulcanisation zone. This facilitates stock sourcing for the dispersion rings. If it is desired to modify the viscosity different dispersion rings may be used for further deformation work in the devulcanisation zone.

The temperature of the temperature control agent is comparable to the temperature of the feedstock/treated goods. For the cooling "comparable" means: the temperature of the temperature control agent is lower than that of the feedstock in order to cause the required and/or desired temperature differential by creating the desired heat flow from the feedstock to the temperature control agent. For the heating "comparable" means: the temperature of the temperature control agent is higher than that of the feedstock in order to cause the required and/or desired temperature differential by creating the desired heat flow from the temperature control agent to the feedstock.

Setting a temperature that is lower than the start region and subsequently increasing the temperature is not recommended because it can easily lead to a shut down.

Commercially available oils can be used as the temperature control agent up to a temperature of 350 degrees Celsius. Above 350 degrees Celsius, oil may also be used as the temperature control agent. However, according to the present application the oil should be kept under nitrogen or another inert agent in order to counteract ignition of the oil.

When controlling the temperature of the feedstock it is advantageous to provide temperature control to the thrust rings and/or intermediate rings and/or dispersion rings. For this, appropriate channels for passing the temperature control agent are then provided in the rings. If the rings are arranged either tightly on the slit or even in the slit between the planetary roller modules then the temperature control agent can be fed with a tube through the slit to the rings or discharged through the slit away from the rings.

At least the temperature of the feedstock or of the processed material may be controlled at the thrust rings and/or intermediate rings and/or dispersion rings. The pressure may be controlled at the dispersion rings, or may be controlled in front of and/or behind the dispersion rings.

A multi-shell housing design of the planetary roller modules with a thin, inner-toothed housing liner is advantageous for heating the feedstock. The thinner the housing liner the better is the heat transfer from the temperature control agent to the feedstock. The reduction in thickness is limited by the required and/or desired stability of the housing liner.

When the housing has a shrink connection with the housing liner this favors a low thickness.

An intensive degassing is provided in the start phase of the devulcanisation. A short processing section or degassing section may be chosen for this.

If the planetary roller modules have a fill level of less than: ninety percent, less than eighty percent, or less than seventy percent, this may be advantageous for the degassing. It may also be appropriate to have fill levels of less than sixty percent and even less than fifty percent. The fill level becomes less with an increased rotational speed.

The degassing devices are each flange-mounted there on the planetary roller modules where a cavity volume is formed due to the fill level being less than one hundred percent.

Degassing devices can be connected to a common suction line. The suctioned off gases are cleaned prior to being released into the surrounding air. An activated carbon filter can be used as a simple and effective cleaning filter.

The results of the separation between heating zone and devulcanisation zone are astonishing.

In the heating zone the feedstock can be optimally prepared for the start of the devulcanisation.

Desired start conditions can be accomplished in the start phase independently of the subsequent processing.

Whereas operational upsets may be expected in larger installations with the mode of operation, the application of the some methods affords a more stable process with a well devulcanised extruded material.

Mooney viscosities of 20 to more than 60, or possibly 30 to 50, or also possibly 35 to 45 may be obtained. The viscosity of the extruded material is measured with a Mooney viscosimeter. The Mooney viscosimeter has a spindle that is rotated in the material sample at a defined material sample temperature. The torque required and/or desired for the rotation of the spindle gives an indication of the viscosity of the material sample. The cited Mooney viscosities refer to a temperature of 100 degrees Celsius.

Compared to some Mooney viscosities that can be achieved at the same temperature, other Mooney viscosities that can be achieved which are significantly higher.

The stability of the process after initiation of the devulcanisation is such that the rotational speed of the central spindle can be increased. The corresponding higher feed rate is synonymous with an increased output of the installation. With comparable installations and a comparable feedstock, the output of a process could be readily increased in tests up to three times that obtained with a different installation and mode of operation.

Furthermore, an adjustment of a mode of operation was possible in larger steps. This is of great importance for the question of admissible fluctuations of the feedstock.

Further, it was found that the devulcanisation proceeds partly without additional extrusion work and by reducing the heating. This is clearly seen with the material as it exits the extruder. Depending on the length of the extruder and on the length of the upstream degassing section a significant gas emission was noted there which should be taken care of with a suction device in order to prevent, restrict, and/or minimize unfiltered gas from escaping into the surroundings.

The present application builds on some methods for the devulcanisation. A still unsolved problem with devulcanisation in planetary roller extruders is the material feed. With the usual feed with a feed part designed as a type of single-screw extruder, it has been observed that malfunctions occur at the transition from the feed part into the planetary roller extruder or into the planetary roller extruder module, already after a short period of operation. Recurring malfunctions occur too readily, for example with feed parts that are specified for planetary roller sections with a construction size above 150. Malfunctions are extremely onerous with feed parts that are specified for planetary roller extruder sections with a construction size above or equal to 350. The construction size indications refer to the pitch diameter of the inner toothing on the housings of a planetary roller extruder section.

OBJECT OR OBJECTS

The present application is based on an object of eliminating and/or reducing the operational malfunctions.

SUMMARY

In this regard the present application is based on the recognition that the malfunctions in the material feed are caused by the decreasing friction between the material and the planetary spindles. The planetary spindles become ever smoother. According to the present application these difficulties are solved by using a planetary roller extruder module as the feed part. The planetary roller extruder itself possesses a feed part with a weaker feed than a feed part that is designed as a type of single-screw. A very much higher pressure can be built up with a single-screw than with a planetary roller extruder.

The higher pressure is better able to transfer the material from the feed part to a downstream extruder section.

The planetary roller extruder module as a feed part takes up the material to be processed far worse than a feed part can that is designed as a type of single-screw extruder. This is due to the fact that the planetary spindles of a feed part designed as a planetary roller extruder section are moved by the material flow. At the same time the planetary spindles are rotated, such that the particles in the material flow are subjected to a more or less violent impact opposite to the intended direction of flow.

Even more surprising is the decreasing friction between the planetary spindles and the scrap rubber particles when the planetary roller extruder sections are used as feed parts.

In one possible exemplification, the particles to be devulcanised are a) conveyed eccentrically to the center of the planetary roller extruder module between the planetary spindles and/or b) mechanically pressed between the planetary spindles with a crammer feeder.

With an eccentric material feed the particles to be devulcanised are directed to the center of the planetary roller extruder/module. The distance of the center of the particle flow from the center of the module can be referred to as the offset. The offset occurs in the rotational direction of the central spindle of the planetary roller extruder. In this regard the central axis of the material feed runs past at a distance from the central axis of the planetary roller extruder. The distance/offset is in one possible exemplification greater than one quarter of the pitch diameter of the toothing in the extruder housing or of the toothing in the inner toothed lining of the housing. In one possible exemplification, the distance/offset is greater than one half of the pitch diameter of the central spindle toothing. In one possible exemplification, the distance/offset is less than half the root circle of the toothing in the extruder housing or of the toothing in the inner toothed lining of the housing.

The diameter of the material feed may be smaller than the diameter of the root circle of the inner toothing of the extruder housing or of the inner toothing of the lining of the housing. Insofar as the material feed with the eccentricity of the present application protrudes laterally over the space in which the material is processed in the planetary roller extruder, then a taper is provided in the transition from the material feed to the housing of the planetary roller extruder. With the taper the material feed is tapered at the transition from the material feed to the extruder housing.

The most favorable conditions exist when the slope in the cross section of the extruder housing lies approximately at a tangent to the pitch diameter of the inner toothing on the extruder housing or on the inner toothed lining of the housing. Approximately means that the slope deviates at most from the tangent to a degree that is equal to the diameter of the planetary spindles that belong to the planetary roller extruder, in one possible exemplification at most equal to half the diameter of the associated planetary spindles and in one possible exemplification equal to a quarter of the diameter of the associated planetary spindles.

For a vertical particle feed into the planetary roller extruder/module, the slope in one possible exemplification encloses an angle of at least thirty degrees, in another possible exemplification an angle of at least forty-five degrees and in yet another exemplification an angle of at least sixty degrees with the horizontal through the center axis of the planetary roller.

In this way the material feed into the planetary roller extruder is improved.

Similar results can be obtained if a slope is provided that follows a curved path instead of a slope that runs straight.

Whereas with a conventional pressureless material feed the danger exists that the particles that fall onto the rotating planetary spindles will be thrust back before they are gripped by the planetary spindles, the eccentric material feed enables even a pressureless feed of the particles into the feed opening of the extruder housing. This is may be economical.

Optionally, a crammer feeder may also be provided, which presses the devulcanisable particles between the planetary spindles of the planetary roller extruder/module.

The crammer feeder may be of the conventional type. Conventional crammer feeders optionally possess a vertical axle on which are mounted paddles that are positioned such that a conveying action is exerted on the feed particles. The crammer feeder may also be designed as a type of extruder screw and with a screw that possesses a considerably greater conveying action than conventional crammer feeders.

The conveying action of a crammer feeder designed as a twin-screw extruder is significantly greater. A trouble-free material feed can be obtained with a twin-screw extruder even without an eccentric material feed.

In the case where a crammer feeder is used, the material feed is advantageously arranged, such that the planetary spindles protrude over the feed opening contrary to the conveying direction.

Even more favorably the protruding ends of the planetary spindles independently of their other toothing carry a conventional toothing.

The conventional toothing provides the planetary spindles with the most purchase between the central spindle and the housing.

The particles to be devulcanised may be advantageously added in a stepwise manner. For example, a partial quantity of the throughput (in kg per hour) can be added in a first step; this allows the devulcanisation process to start more easily than with the total quantity. The partial quantity for the start of the devulcanisation is in one possible exemplification 60 wt % at most, based on the total quantity; in another possible exemplification 50 wt % at most and in yet another possible exemplification 40 wt % at most. The starting quantity may also be 30 wt % or even less. Thus, for a targeted production of 2000 kilograms of devulcanised scrap rubber this would result in a starting quantity of 1200 kilograms per hour at most or 800 kilograms per hour at most or 600 kilograms per hour.

The process remains surprisingly stable once the devulcanisation process has started. The remaining quantity may be added at once or in gradual steps, without interrupting the process.

This method is recommended when the devulcanisation process with the total quantity is slow to initiate.

For a stepwise addition of material to be devulcanised the planet roller extruders are modularly designed.

A planetary roller extruder module can then be arranged with the material feed at each desired location. In this regard the desired location or the additional locations of the material feed do not have to be calculated in advance. It is also possible to find the correct location empirically by arranging the material feed in the second or third planetary roller extruder module. This is done by arranging the planetary roller extruder module that is equipped with the additional material feed as the second and/or third and/or fourth module.

The planetary roller extruder module according to the present application is employed in a multiple design or in combination with one or more feeding devices designed as a type of twin-screw extruder or with a conventional feeding device that simulates a single-screw extruder and for example is equipped with a feed hopper.

This also allows materials to be processed which may not be added together in a mixture or which should be added one after the other and if needed and/or desired sequentially in a mixture. Furthermore, difficultly processable materials, for example solids that tend to stick and scorch or solids that tend to demix, can be added as late as possible into the mixture.

The procedure according to the present application enables solids to be mixed together and optionally also with liquids or with melts.

In most cases an accurate dosing is advantageous. The dosing may be by volume or by weight.

The solids may be pressurelessly conveyed or mechanically conveyed with a crammer feeder into the extruder.

The planetary spindles under the abovementioned conditions may be wholly or partially formed from the conventional toothing or be combined with planetary spindles of another design.

A temperature control of the connections and/or of other feed parts, such as the feed hopper, may be provided for heat-sensitive materials.

The technology according to the present application may be advantageous when the extruder is employed for example in chemical processes, in the food industry or plastics industry.

Over and above the processing of scrap rubber the described feedparts may also be advantageous when used for various other materials. These include inter alia elastomers, polyurethanes, adhesives, chewing gum.

In addition, they may also include finely divided, even powdered materials, which are difficult to feed.

The elastomers and comparable substances are of considerable importance economically and technologically. Whenever plastics are intended to be subjected to a severe deformation and should regain their original shape once the strain has been relieved, then elastomers and similar rubber-elastic plastics (rubbers) are considered. Plastics comprise large molecular chains. The high elasticity of the elastomers is given due to a phenomenon in the behavior of the molecular chains. When the molecular chains that are originally in the form of clusters are subjected to tensile stress the molecular chains adopt another conformation, in one possible exemplification a parallel or substantially parallel conformation, and the molecular chains are stretched.

For the desired deformation, however, a prerequisite is that the molecular chains do not slip on each other. This is achieved by crosslinking the molecular chains. The deformation is influenced by the degree of crosslinking. A low degree of crosslinking results in a soft plastic. Increased crosslinking results in a harder plastic.

There are different crosslinking agents. The crosslinking agent is chosen depending on the plastic. Sulfur is a frequently used crosslinking agent. Sulfur acts as a crosslinking agent when the plastic is sufficiently heated. Other crosslinking agents are not dependent on the effect of heat; their crosslinking action can also be dependent on other factors.

The elastomers include for example:
Acrylonitrile-butadiene rubber (NBR)
Acrylonitrile/butadiene/acrylate (A/B/A)
Acrylonitrile/chlorinated polyethylene/styrene (A/PE-C/S)
Acrylonitrile/methyl methacrylate (A/MMA)
Butadiene rubber (BR)
Butyl rubber (HR) (IIR)
Chloroprene rubber (CR)
Ethylene ethyl acrylate copolymer (EEA)
Ethylene-propylene copolymer (EPM)
Ethylene-propylene-diene rubber (EPDM)
Ethylene vinyl acetate (EVA)
Fluoro rubber (FPM or FKM)
Isoprene rubber (IR)
Natural rubber (NR)
Polybutadiene rubber BR
Polyethylene resins
Polyisobutylene (PIB)
Polypropylene resins
Polyvinyl butyral (PVB)
Silicone rubber (Q or SIR)
Styrene-isoprene-styrene block copolymer (SIS)
Styrene-butadiene rubber (SBR)
Styrene-butadiene-styrene (SBS)
Thermoplastic polyurethane (TPU or TPE-U)
Vinyl chloride/ethylene (VC/E)
Vinyl chloride/ethylene/methacrylate (VC/E/MA)

The danger of sticking and scorching is in one possible exemplification high for elastomers if thermally activatable crosslinking agents are fed in through the feed part along with the other material. Sticking and scorching leads to unforeseen heating, to an unforeseen initiation of the crosslinking and to worsened material characteristics. The unwanted difficulties arising from sticking and scorching in the feed part can be avoided, restricted, and/or minimized with the described feed part.

For polyurethanes it is essential to combine two reaction components in the correct proportion. The reaction components may be combined with the help of an extruder. Slight irregularities in the material supply already impair the mixture. This can also be avoided, restricted, and/or minimized with the described feed part in the inlet section.

Some adhesives may be processed in the extruder. Processing the adhesive in the extruder can be greatly facilitated by using the described feed part.

Processing chewing gum in an extruder is known. The heat-sensitive base mixture comprises lecithin, plasticisers, syrup, sugar, oils, fragrances and elastomers. Among these are very sticky ingredients that are prone to scorch.

This production is also greatly facilitated with the described feed part.

The planetary roller extruder module according to the present application is optionally employed in a multiple design or in combination with a conventional feed part that simulates a single-screw extruder and for example is equipped with a feed hopper. In this way material can be added at various points. This also allows materials to be processed which may not be added together in a mixture or which should be added one after the other and if needed and/or desired sequentially in a mixture. Furthermore, difficultly processable materials, for example solids that tend to stick and scorch or solids that tend to demix, can be added as late as possible into the mixture.

The procedure according to the present application enables solids to be mixed together and optionally also with liquids or with melts.

In most cases an accurate dosing is advantageous. The dosing may be by volume or by weight. The solids may be pressurelessly conveyed or mechanically conveyed with a crammer feeder into the extruder.

The above-discussed exemplifications of the present invention will be described further herein below. When the word "invention" or "exemplification of the invention" is used in this specification, the word "invention" or "exemplification of the invention" includes "inventions" or "exemplifications of the invention", that is the plural of "invention" or "exemplification of the invention". By stating "invention"

or "exemplification of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

FIG. 1A shows another possible extrusion line;
FIG. 2 shows a planetary roller extruder module;
FIG. 3 shows a planetary roller extruder module;
FIG. 4 shows a planetary roller extruder module;
FIG. 6 shows another module;
FIG. 7 shows another module;
FIG. 9 shows components of a planetary roller extruder;
FIG. 10 shows components of a planetary roller extruder.

DESCRIPTION OF EXEMPLIFICATION OR EXEMPLIFICATIONS

Figure 1:
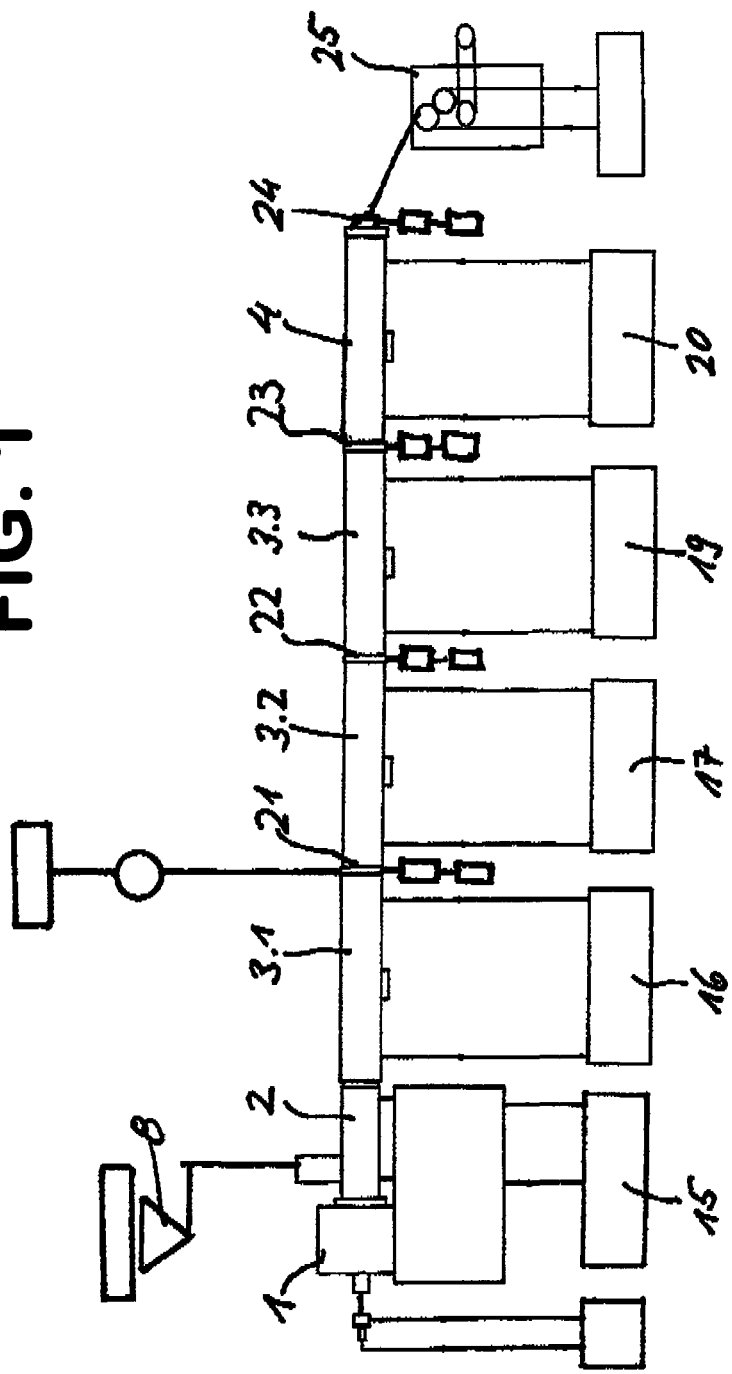
FIG. 1 shows a possible extrusion line.

The drawing displays an extrusion line for a process for the application with scrap rubber.

The extrusion line in FIG. 1 has a construction size of 70. The line comprises various sections 2, 3a, 3b, 4, 5, 6. Section 2 is a feed part and designed as a type of single-screw extruder.

Sections 3a, 3b, 4, 5, 6 are planetary roller modules. The various planetary roller modules include an internally toothed cylindrical housing, planetary spindles (not shown) and a central spindle (not shown). A common central spindle is provided here for planetary roller modules and for the feed part. This means that the central spindle extends through the planetary roller modules and through the feed part 2 to the gear 1. The gear is moved by a drive motor. Consequently the central spindle rotates in the extruder. The planetary spindles that mesh with the central spindle run around the central spindle and mesh with the internally toothed housing of the planetary roller modules. The length of each planetary roller module 4, 5 and 6 is 400 millimeters. The length of each planetary roller module 3a and 3b is 200 millimeters.

Each planetary roller module is equipped with five planetary spindles. The number of planetary spindles has an influence on the fill level of the planetary roller modules. The lower the number of planetary spindles the greater cavities can be produced.

The planetary spindles of the modules 4 and 5 are designed as back-cut spindles and evenly distributed on the periphery of the central spindle. Among the planetary spindles of the module 6 three planetary spindles are likewise designed as back-cut spindles. The other planetary spindles of module 6 are designed as transport spindles.

The planetary roller modules 3a and 3b possess more planetary spindles than the other planetary roller modules, namely six. Moreover, the planetary spindles of the modules 3a and 3b are equipped with a standard toothing. The standard toothing causes a higher mechanical stress of the scrap rubber than the planetary spindles provided in the other modules, whose back-cut spindles are very conducive for the degassing and whose transport spindles are conducive for both the degassing as well as for generating a considerable conveying effect. The scrap rubber is very strongly rolled out into thin layers in the standard toothing. This intensifies the heat flow.

Among the planetary spindles in the planetary roller modules 4, 5, 6 three back-cut spindles each have the same length of 373 millimeters. In contrast, the other planetary spindles are longer. They are 399 millimeters long. The different lengths of the planetary spindles draw in the scrap rubber into the active zones of the spindles.

Planetary roller modules 3a and 3b on the other hand are provided with three planetary spindles of this length. The other three planetary spindles have a shorter length of 373 millimeters.

The planetary spindles slide (in a manner not shown) on customary thrust rings. In the exemplification the thrust rings are connected (in a manner not shown) to dispersion rings.

The dispersion ring for the module 3a is labeled 19, the dispersion ring for the module 3b is labeled 20, the dispersion ring for the module 4 is labeled 21, the dispersion ring for the module 5 is labeled 22. Moreover, one other dispersion ring 36 is provided on the last module 6.

The modules 3b, 5, 6 are equipped with a degassing unit 30, 32, 35. The degassing units are formed by side arm extruders that, contrary to the illustration of the drawing, stand perpendicular or substantially perpendicular to the associated modules.

In this regard the side arm extruder 30 is at a short distance from the dispersion ring 19, the side arm extruder 32 is at a short distance from the dispersion ring 21, the side arm extruder 35 is at a short distance from the dispersion ring 22.

Each side arm extruder is subjected to a negative pressure. During the degassing the side arm extruders are run empty, such that feedstock/processed material that is under high pressure in the extruder and tends to exit with the suctioned-off gas, is forced back again into the extruder.

In the exemplification the scrap rubber in finely divided form is dosed into the feed part 2. The dosing unit is labeled 7, the material inlet 40.

At the material inlet there is also an opening 41, through which remaining material can be blown out when the line is shut down.

During the devulcanisation process the planetary roller modules 3, 4, 5 are temperature controlled with oil coolers 10a, 10b, 11, 12, 13.

The temperature control for the feed part is labeled 14.

A temperature control 15 is also provided for the central spindle (not shown).

When starting-up, oil is initially introduced into the feed part by a pump 45 before scrap rubber is fed to the feed part. This prevents, restricts, and/or minimizes the moving extruder parts from running dry.

The scrap rubber introduced into the feed part 2 is subjected to mechanical deformation and stress by the screw of the feed part. This simultaneously heats the scrap rubber.

In addition, the temperature control agent of the temperature control 15 is set for example to a temperature of 120 degrees Celsius. In other examples a higher or lower temperature is used. The temperature control 15 is in one possible exemplification adjustable to 140 degrees Celsius.

The scrap rubber is pressed out of the feed part 2 into the module 3 that forms a heating zone. In the heating zone the scrap rubber is heated to a material-dependent start temperature for devulcanisation. In the example the start temperature is 310 degrees Celsius. For this the temperature control 10*a* of the module 3*a* is set to 330 degrees Celsius in the example. The scrap rubber is simultaneously intensively mixed and rolled out in the module 3*a*.

After the scrap rubber has been heated to the start temperature it is pressed through the slit on the dispersion ring 19. After homogenization from the dispersion ring 19 the molecular chains of the scrap rubber are broken up to such an extent that sulfur can escape from the feedstock/processed material. The release of the sulfur is promoted by the intensive mixing and rolling out of the feedstock/processed material in the module 3*b*. The released, gaseous sulfur is simultaneously or substantially simultaneously suctioned off through the degassing unit 30.

The devulcanisation of the feedstock is started in module 3*b*.

In order to achieve an adequate devulcanisation the processing must be or should be continued.

The feedstock/processed material is pressed out of module 3*b* into module 4. The feedstock/processed material then passes the dispersion ring 20. In module 4 the feedstock/processed material is further processed and pressed through another dispersion ring 21. The thus-processed material is then further processed in module 5 and degassed.

After exiting the planetary roller module 5 the devulcanised scrap rubber is cooled down to 220 degrees Celsius in the planetary roller module 6 before exiting as a crumbly mass out of the extrusion line, and cooled down in a water cooler 16 to room temperature.

A water cooler 13 for the cooling is provided on the planetary roller module 6.

The feed part 2 is also equipped with a water cooler 14.

The cooling temperatures at the feed part and after the devulcanisation are also material-dependent.

In the exemplification an internal cooling of the central spindle is also provided. The associated cooler 15, like the coolers 10, 11, 12, is an oil cooler and set to a temperature of 300 degrees Celsius.

The devulcanisation is caused by the mechanical and thermal stressing of the scrap rubber in the extrusion line.

The dispersion rings 20, 21, 22 also contribute to the mechanical stress in the planetary roller modules 3, 4, 5.

In the exemplification the dispersion rings are arranged behind the thrust rings (not shown) in the machine direction of the scrap rubber through the unit.

In this regard the inner diameter of the dispersion rings 20, 21, 22 is smaller than the external diameter of the central spindle. The dispersion rings 20, 21, 22 engage into the grooves (not shown) in the central spindle, such that the tooth gaps between the teeth of the central spindle are closed except for a narrow gap at the tooth base. The dispersion rings 20, 21, 22 are maintained between the corresponding ends of the planetary roller modules, such that the housing space around the central spindle is also closed and the scrap rubber is forced to pass through the narrow gap. The narrowing of the gap is material-dependent and causes an extreme deformation and extreme mechanical stressing of the feedstock.

In detail, the dispersion ring 20 is provided between the planetary roller modules 3 and 4, the dispersion ring 21 is provided between the planetary roller modules 4 and 5 and the dispersion ring 22 is provided between the planetary roller modules 5 and 6.

The dispersion rings 20, 21, 22 are clamped by clamping the cylindrical housing of the planetary roller modules 3, 4, 5, 6.

For this the planetary roller modules 3, 4, 5, 6 possess on their ends typical flanges that are pushed against one another with clamping screws.

The feed part 2 also possesses typical flanges. The feed part is clamped with these flanges on the one hand to the housing of the drive 1 and on the other hand with the planetary roller module 3.

For the dispersion rings 20, 21, 22 that in the exemplification engage into grooves of the central spindle, provision is made that these rings are composed of two halves in order to facilitate their mounting.

The mounting is mentioned below for the dispersion ring 20. The other dispersion rings 20, 21, 22 are mounted correspondingly.

After the feed part housing has been mounted the central spindle with its end designed as a single screw is initially pushed into the feed part housing and coupled to the drive.

The housing of the planetary roller module 3 is then pushed over the central spindle and clamped with the feed part housing.

The planetary spindles of the planetary roller module 3 are then put in place. For this the planetary spindles are rotatably pushed into their predefined position between the housing and central spindle. The position of the planetary spindles is characterized by an even distribution on the periphery of the central spindle and the already described toothing engagement of the planetary spindles with the inner toothing of the housing and the outer toothing of the central spindle.

After the planetary spindles have been put into position, the thrust ring for the planetary spindles is pushed over the central spindle and into a central opening of the housing end of the planetary roller module. The thrust ring has a wear resistant, hard metal coating in its contact area with the planetary spindles.

After the thrust ring has been put in position, the dispersion ring 20, comprising two halves, is moved to the thrust ring up against the machine. The halves are pushed at the same time into a groove of the central spindle. The dispersion ring is then centered with the help of a one-piece support ring that can be pushed over the central spindle and is itself centered in the same housing opening as the thrust ring in the planetary roller module 3. The dimensions of the support ring are such that it protrudes out of the end of the housing opening of the planetary roller module 3 and forms a centering means for mounting the following housing of the planetary roller module 4.

The housing of the planetary roller module 4 is thus clamped with the housing of the planetary roller module 3 in the above described shape. This clamping simultaneously clamps the thrust ring, the dispersion ring and the support ring.

In FIGS. 2 and 3 the feed zone 2 is designed as a planetary roller extruder module.

The planetary roller extruder module possesses a housing 100 that is equipped on each end with a flange 101. Moreover, the housing possesses a lining 109 that is equipped with an inner toothing 110. Cooling/heating channels 108 are worked into the exterior of the lining. In the assembled state the heating/cooling channels 108 are externally enclosed by the housing. Supply lines/discharge lines for a temperature control agent are provided on the ends of the heating/cooling channels. FIG. 3 illustrates a connection 103 for both of the supply lines/discharge lines.

A central spindle 107 is arranged in the center of the housing 100. On the gear side the central spindle 107 is designed as a splined shaft 105 in order to correspond to a drive motor.

Planetary spindles 106 are provided between the inner toothing 110 and the central spindle 107. The planetary spindles 106 mesh with the toothing of the central spindle 107 and the inner toothing 110.

In the exemplification a part of the planetary spindles is equipped with a conventional/standard toothing like the central spindle and the housing 109. The remaining planetary spindles are designed as transport spindles, wherein the transport spindles counter to the conveying direction of the feed part protrude beyond its inlet opening 104 and wherein each transport spindle is equipped on both ends with a conventional toothing that increases the purchase of the transport spindles in the toothing of the central spindle and in the inner toothing of the housing.

Moreover, a flange 102 with an inlet opening 104 for the scrap rubber to be devulcanised is provided on top of the housing 100. On the flange 102 is fixed a crammer feeder (not shown) designed as a type of twin-screw extruder and which presses the particles to be devulcanised into the feed part. No additional temperature control of the flange is provided in the exemplification. In other exemplifications an additional temperature control (not shown) of the flange is provided.

FIG. 4 shows the feed zone with an opened cover 100, such that the planetary spindles 106 may be seen.

The scrap rubber drops between the transport spindles 106 and is gripped by them and mixed very gently and conveyed in the direction of the other planetary roller extruder sections/modules to be further processed there.

Figure 5:
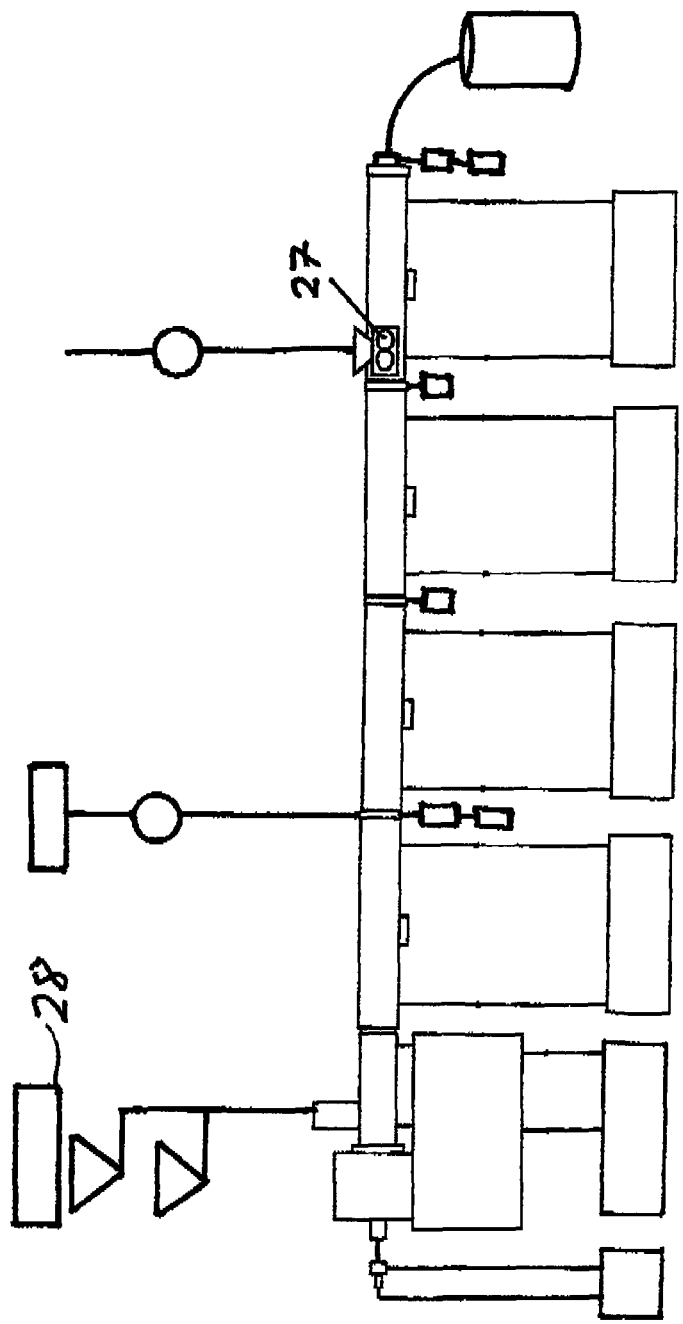
FIG. 5 shows another possible extrusion line.

FIGS. 5 and 6 show another exemplification.

This exemplification is different due to its different housing cover 119. The housing cover 119 also possesses an inlet opening 120 for adding material. Moreover, the housing cover 119 is equipped with an inner toothing 121 that like the inner toothing cooperates with the planetary spindles 106. In contrast to the housing inner toothing of FIGS. 2 to 4, the toothing, however, is truncated in the zone 122 adjacent to the inlet opening 120 and extending in the rotational direction of the central spindle. In the illustration the direction of rotation of the central spindle runs clockwise.

At the end adjacent to the inlet opening the teeth are reduced in height by three-fourths by the truncation. In the exemplification this truncation 133 decreases along the direction of rotation of the central spindle. In the embodiment the truncation 133 extends over one-tenth of the periphery of the pitch circle belonging to the housing inner toothing. In other exemplifications the zone can extend over at least one-fourth of the periphery of the pitch circle or at least one-half of the pitch circle of the periphery or at least three-fourths of the periphery of the pitch circle. The degree of extension of the zone 122 is defined from the point at which the zone 122 is joined with a section through the middle of the circular cross section of the inlet opening to the inlet opening.

The direction of extension of the zone 122 runs solely in the peripheral direction. In other exemplifications the illustrated direction of extension may also run in the peripheral direction and simultaneously tilt to the longitudinal direction of the housing.

In the exemplification the truncation 133 can extend over the whole opening width of the inlet opening. In other exemplifications the truncation 133 extends over at most 90% of the opening width of the inlet opening, in still other exemplifications over at most eighty percent of the opening width of the inlet opening and in still other exemplifications over at most seventy percent of the opening width of the inlet opening.

In still other exemplifications, if needed and/or desired, the truncation 133 in the width illustrated in FIG. 5 can also extend beyond the opening width of the inlet opening, for example by at most ten percent further than the opening width or by at most twenty percent further than the opening width or by at most thirty percent of the opening width.

The truncation shown in FIGS. 5 and 6 forms a feed hopper that facilitates the feed of the feedstock into the extrusion unit.

FIG. 7 shows an original tooth 136 between tooth gaps 135. The illustration includes a section of a housing inner toothing.

A tooth 137, illustrated with a dot-dashed line, is shown here with a lower height, round tip and tooth flanks, which slope less towards the pitch diameter of the housing inner toothing than the tooth flanks of the original tooth 136. In the exemplification this contour was produced by electrical discharge machining. In other exemplifications the contour was produced by milling.

In the exemplification the feed hopper is combined with a central material feed according to FIGS. 2 to 4.

In other exemplifications the feed hopper is combined with an eccentric material feed.

Figure 8:
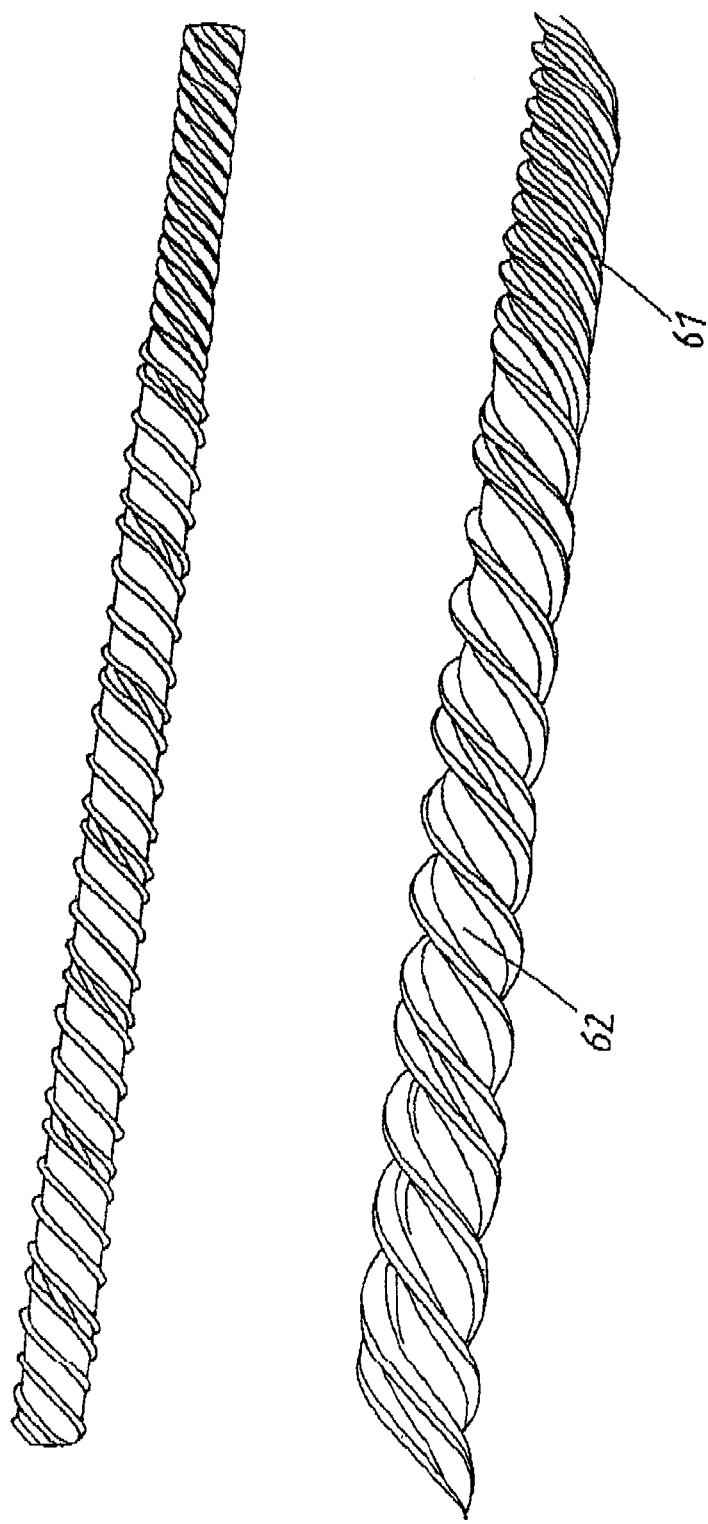
FIG. 8 shows components of a planetary roller extruder.
Figure 11:
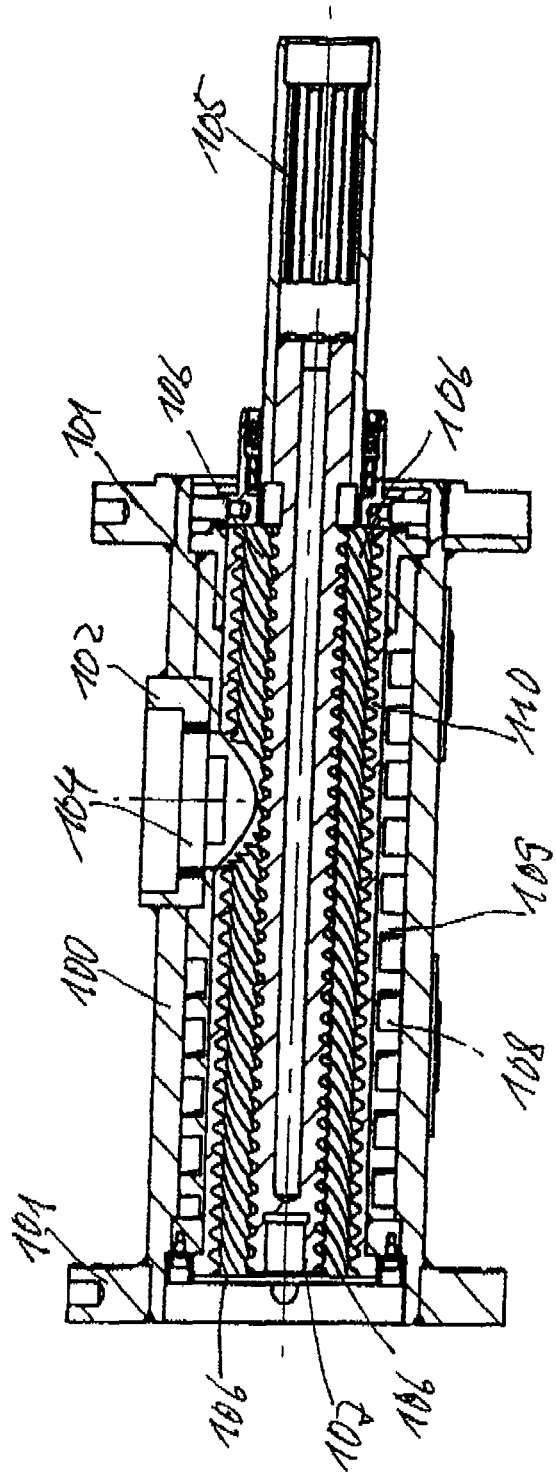
FIG. 11 shows components of a planetary roller extruder.
Figure 12:
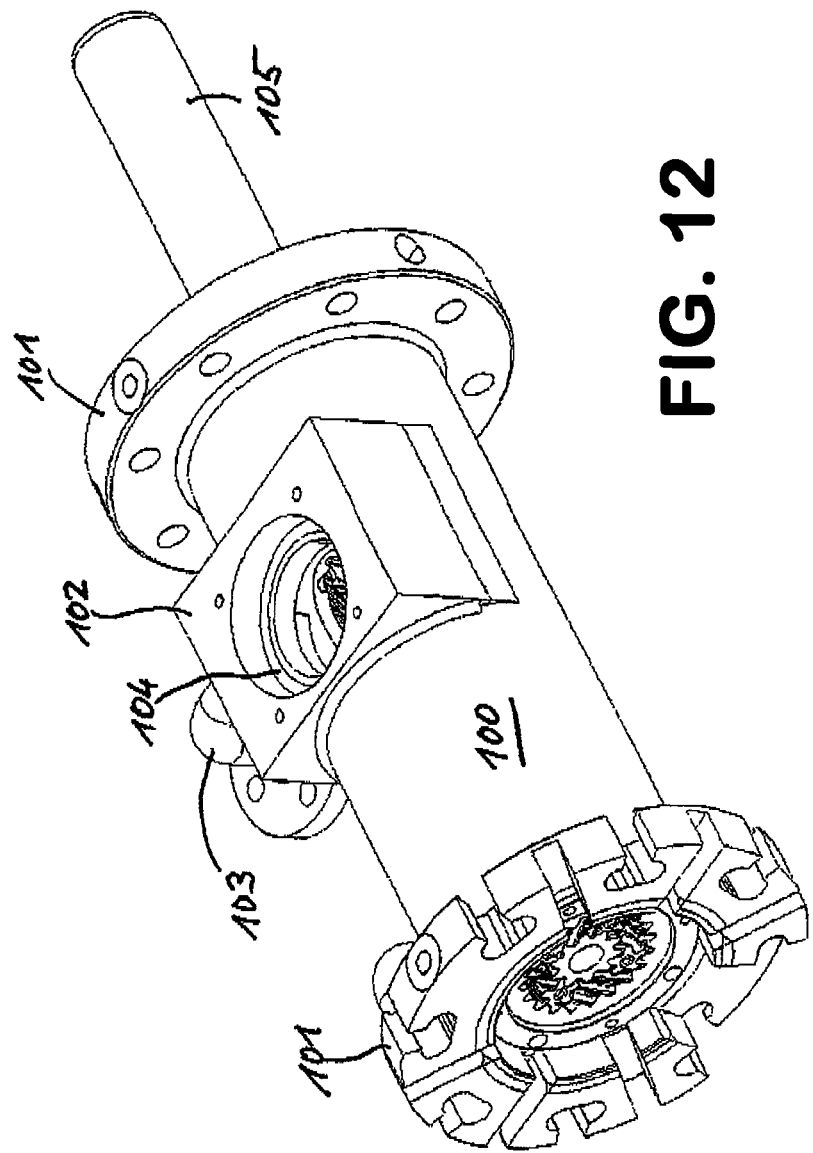
FIG. 12 shows a portion of a planetary roller extruder.
Figure 13:
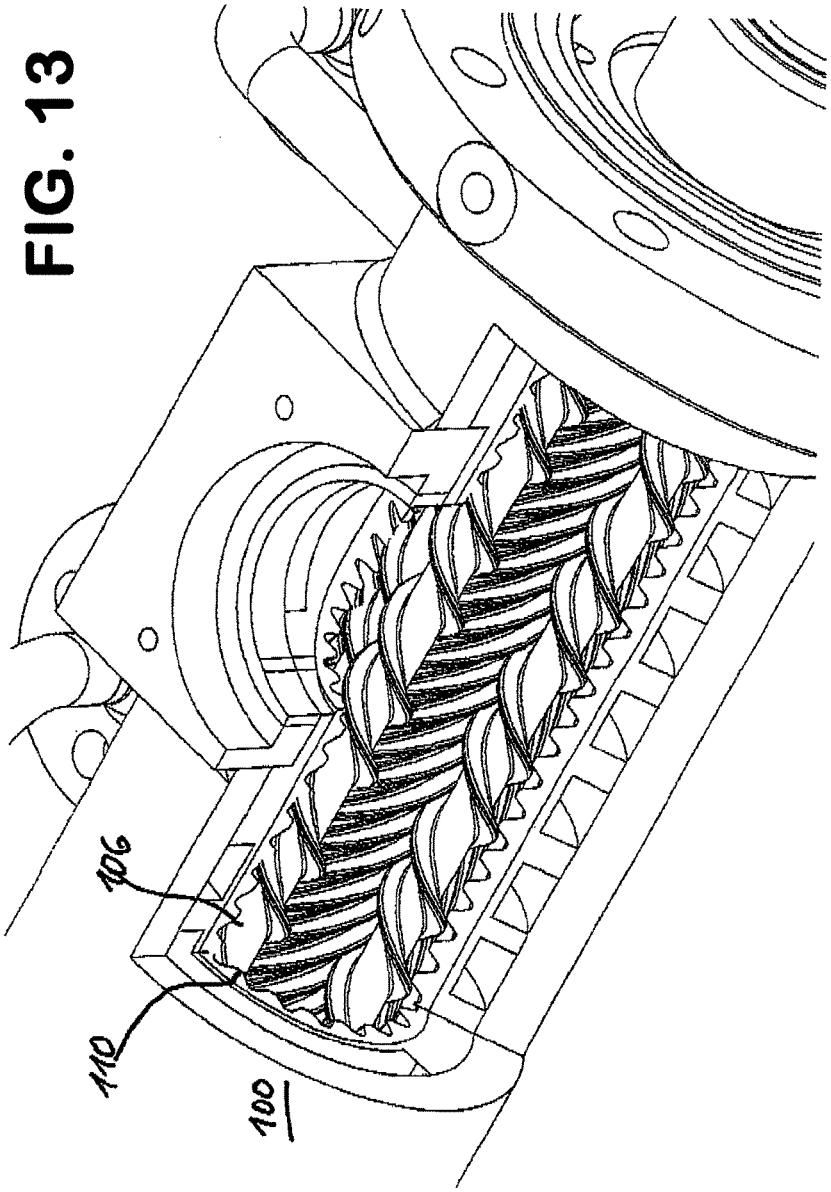
FIG. 13 shows an inner portion of plan roller extruder.
Figure 14:
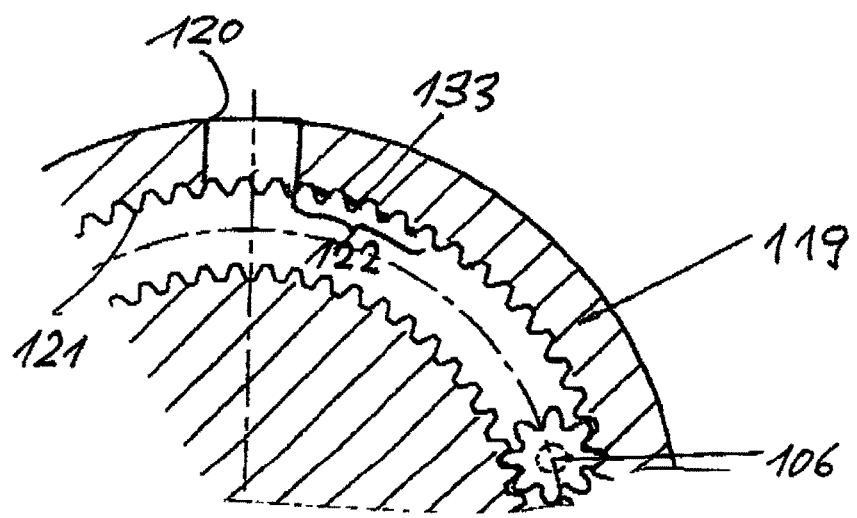
FIG. 14 shows components of a planetary roller extruder.
Figure 15:
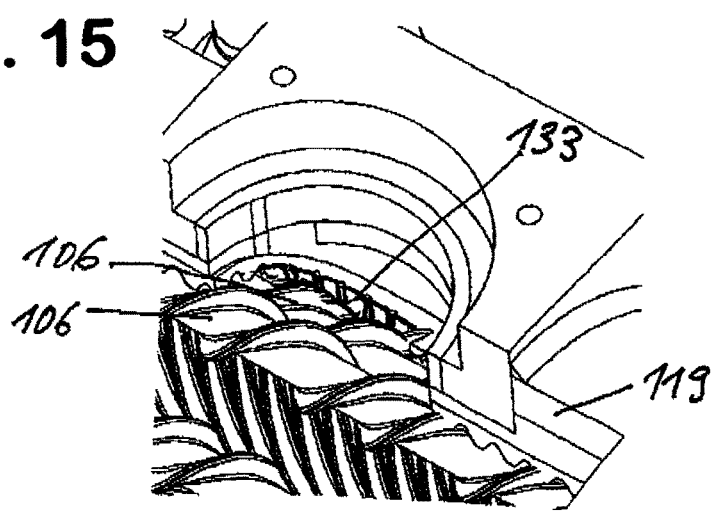
FIG. 15 shows components of a planetary roller extruder.
Figure 16:
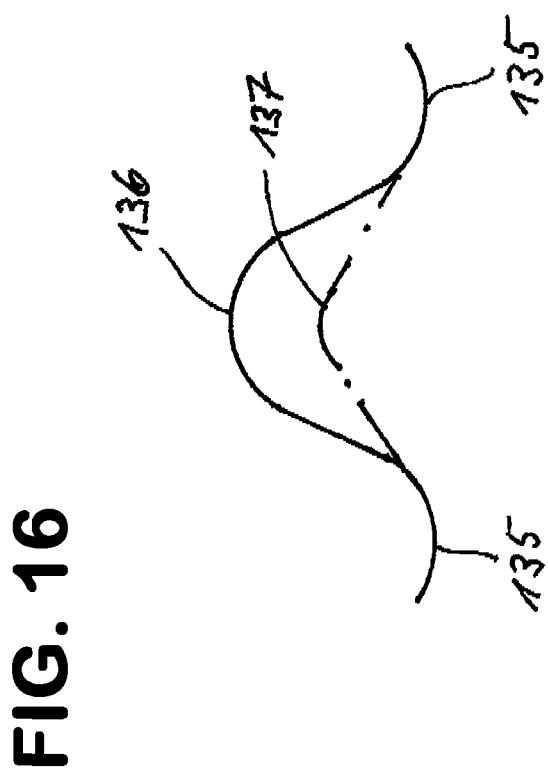
FIG. 16 shows a portion of a plan roller extruder.
Figure 17:
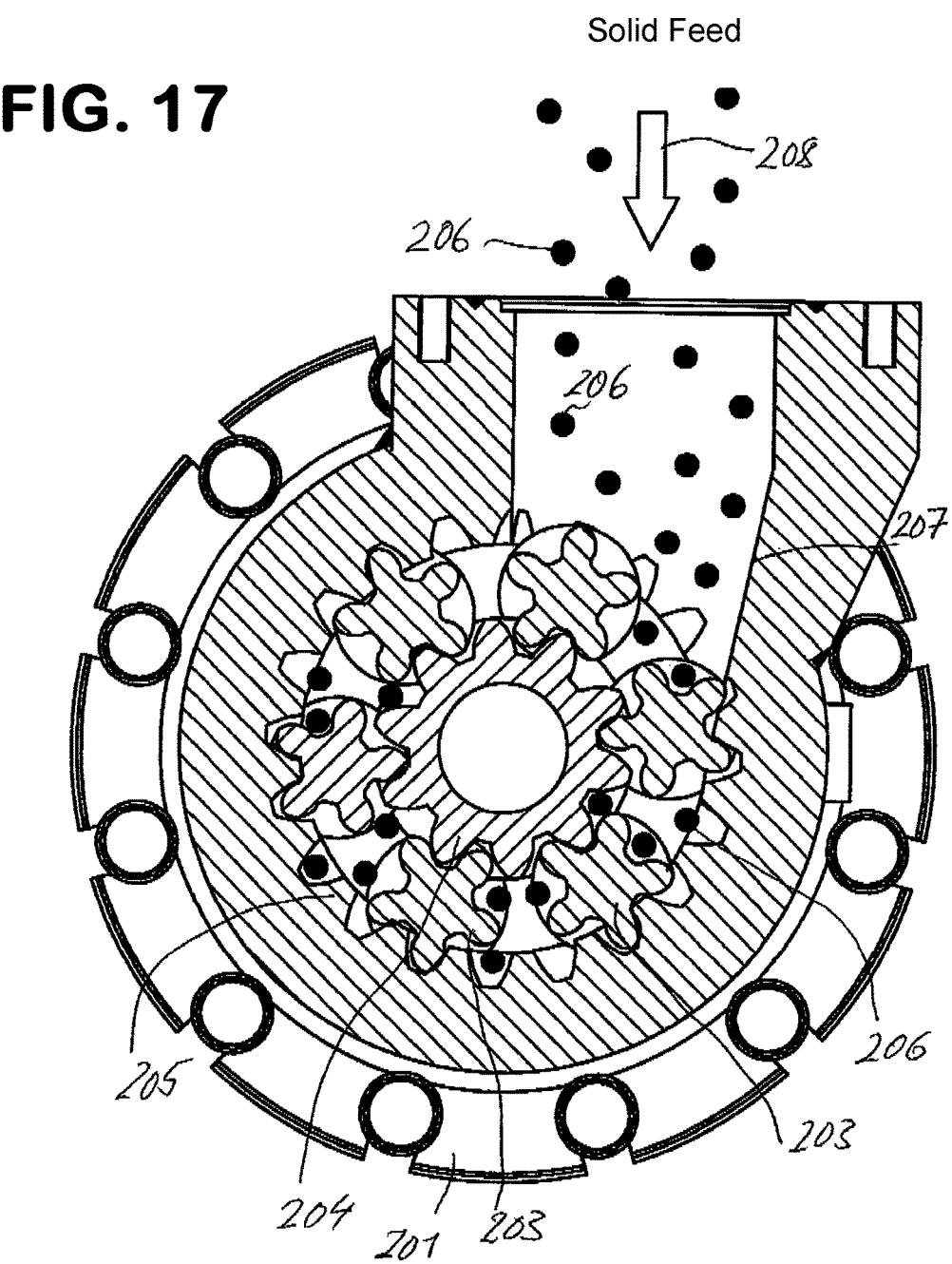
FIG. 17 shows a cross section of a plan roller extruder.
Figure 18:
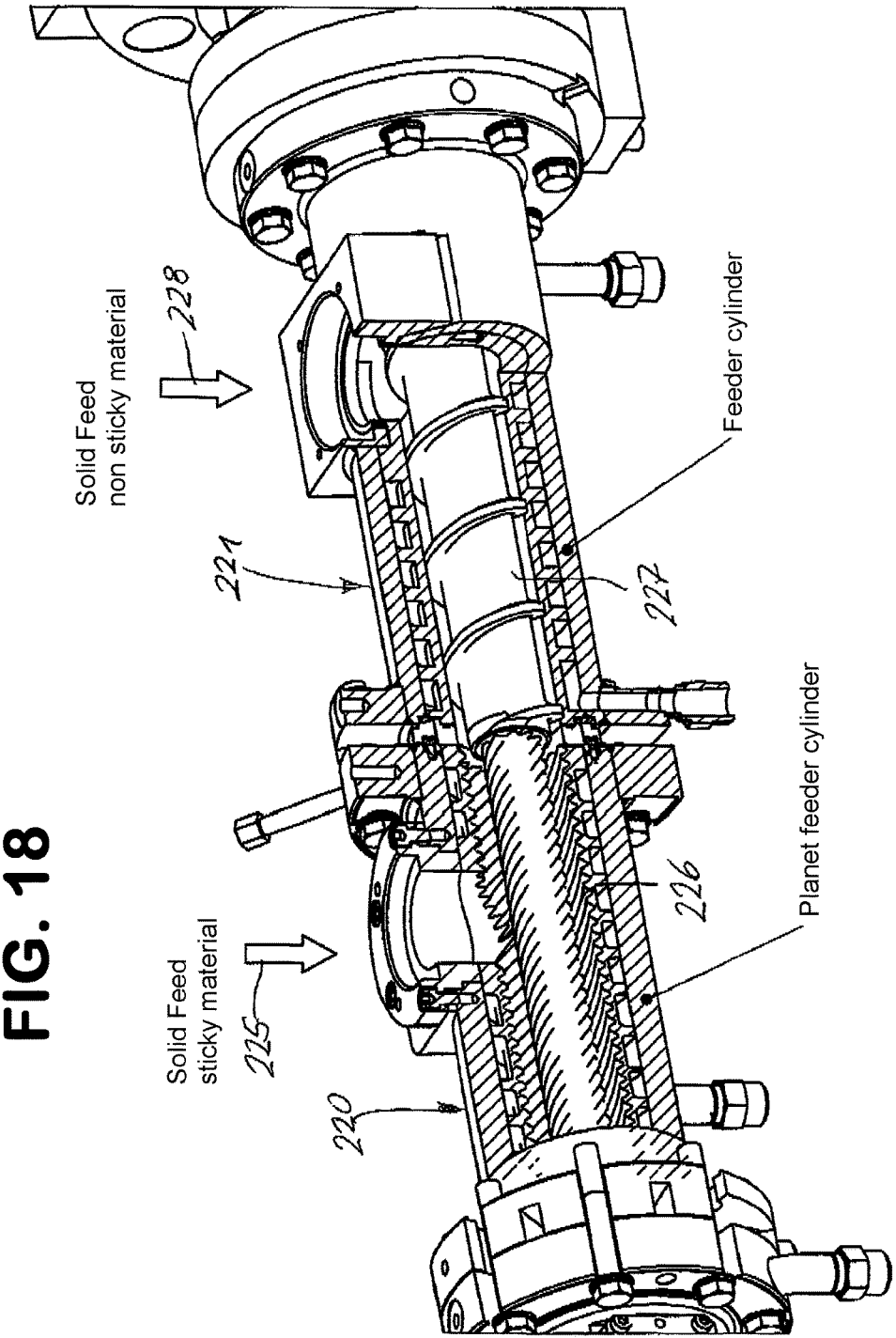
FIG. 18 shows components of a planetary roller extruder.

FIG. 8 shows a cross section through a planetary roller extruder section with an eccentric solid feed 202. The cross section shows a housing 201 with an inner toothing 205. A central spindle 204 and planetary spindles 203 rotate in the housing 201.

The particle feed/material feed 202 possesses a hopper (not shown) with a cylindrical intake that is flange-mounted on the housing 201. The hopper with the cylindrical intake is arranged eccentrically in relation to the middle of the central spindle 204. This means that the central axis 208 of the feed 202 is offset from the central axis of the central spindle. In the exemplification the offset of both axes is somewhat larger than one quarter of the pitch diameter of the housing inner toothing 205 but considerably less than half of the pitch diameter of the housing inner toothing 205.

Consequently, the central axis 208 of the feed 202 points into a zone of the trajectory of the planetary spindles 203 in which the planetary spindles 203, after reaching the highest position according to FIG. 8, clearly move backwards. In this way the material is fed much better into the planetary roller extruder module than by the conventional placement of the material feed above the planetary roller extruder module, in which the central axis of the feed stands perpendicularly or substantially perpendicularly above the central axis of the planetary roller extruder module. In the view of FIG. 8 the material is schematically shown as particles 206.

As a consequence of the correspondingly large diameter, the feed 202 in the eccentric design according to the present application clearly protrudes in the vertical projection to a horizontal plane, in which the central axis of the planetary roller extruder module lies. Nonetheless, in order to essentially ensure and/or promote that the scrap rubber particles are optimally guided into the planetary roller extruder module a tapered transition 207 is provided from the material feed into the planetary roller extruder module. In the embodiment the transition forms a slope. The slope runs at an angle of sixty degrees to the horizontal.

In at least one possible exemplification, the eccentric feed of FIG. 8 works so well that the scrap rubber particles can even be fed into the feed section in a pressureless manner.

Pressureless means that the particles are solely gravity-fed into the inlet from a hopper placed above the feed opening.

In other exemplifications the eccentric inlet is combined with a crammer feeder so as to essentially ensure and/or promote a higher feed of scrap rubber particles.

According to the present application a feed part designed as a planetary roller extruder section is used for devulcanising scrap rubber.

One feature or aspect of an exemplification is believed at the time of the filing of this patent application to possibly reside broadly in a process for the devulcanisation of crosslinked rubber and crosslinked elastomers, the molecular chains of which are destructible as far as the hydrocarbon molecules by mechanical and thermal stress, wherein the particles of the material to be devulcanised are pressed through a feed part into an extruder and heated so long and so intensively deformed until there results a desired disintegration of the molecular chains, wherein the mechanical and thermal processing occurs in a planetary roller extruder, wherein the planetary roller extruder comprises a housing, planetary spindles and a central spindle, and the central spindle intermeshes with the planetary spindles and the planetary spindles intermesh with an internal toothing of the housing or with the internal toothing of a liner provided in the housing, such that one revolution of the central spindle causes the planetary spindles to rotate around the central spindle in the housing, wherein the planetary spindles of one extruder section slide with a facing surface at a stop ring of this extruder section, wherein a planetary roller extruder section is used as the feed part, wherein the particles to be devulcanised a) are added eccentrically to the center of the planetary roller extruder module between the planetary spindles and/or b) mechanically pressed between the planetary spindles with a crammer feeder.

Another feature or aspect of an exemplification is believed at the time of the filing of this patent application to possibly reside broadly in the process, wherein the particles to be devulcanised a) are added eccentrically to the center of the planetary roller extruder module between the planetary spindles and/or b) mechanically pressed between the planetary spindles with a crammer feeder.

Yet another feature or aspect of an exemplification is believed at the time of the filing of this patent application to possibly reside broadly in the process, including the use of a feed part with a feed opening, whose center is offset from the central axis of the feed port designed as the planetary roller extruder section, wherein the offset is at least equal to a quarter of the pitch diameter of the inner toothing of the extruder housing or of the inner toothing of the lining of the housing.

Still another feature or aspect of an exemplification is believed at the time of the filing of this patent application to possibly reside broadly in the process, including the use of an offset that is smaller than half of the pitch diameter of the inner toothing of the extruder housing or of an inner toothed lining of the housing.

A further feature or aspect of an exemplification is believed at the time of the filing of this patent application to possibly reside broadly in the process, including the use of an extruder with an offset that is greater than half of the root diameter of the central spindle toothing and smaller than half the root diameter of the inner toothing of the extruder housing or of an inner toothed lining of the housing.

Another feature or aspect of an exemplification is believed at the time of the filing of this patent application to possibly reside broadly in the process, including the use of an extruder with a material feed that has a taper at the transition to the planetary roller extruder housing, insofar as the material feed protrudes against the extruder housing.

Yet another feature or aspect of an exemplification is believed at the time of the filing of this patent application to possibly reside broadly in the process, including the use of an extruder, whose slope to the material feed lies approximately on a tangent to the pitch diameter of the inner toothing on the extruder housing or on the inner toothed lining of the housing, wherein the extent of "approximately" includes a maximum deviation from the tangent which is equal to the diameter of the planetary spindles, in one possible exemplification equal to half the diameter of the planetary spindles and in another possible exemplification equal to a quarter of the diameter of the planetary spindles, wherein the slope with the horizontal through the center of the extruder encloses an angle of at least 30°, in at least one possible exemplification an angle of at least 45° and in another possible exemplification at least 60°.

Still another feature or aspect of an exemplification is believed at the time of the filing of this patent application to possibly reside broadly in the process, including the use of an extruder, whose planetary spindles in the inlet zone of the material from the material feed, at least for pressureless material feeds, are designed at least partly as transport spindles and/or whose inner toothing of the housing is truncated to form an inlet funnel in the toothing, at least in the zone that adjoins the inlet opening of the housing cover, and extends in the direction of rotation of the central spindle.

A further feature or aspect of an exemplification is believed at the time of the filing of this patent application to possibly reside broadly in the process, including the use of an extruder, whose inlet zone is the annular surface on the housing cover, in which the opening for the material feed lies plus/minus with an annular surface width deviation of 50%, in one possible exemplification of plus/minus 30% and in another possible exemplification of plus/minus 10% of an annular surface width deviation.

Another feature or aspect of an exemplification is believed at the time of the filing of this patent application to possibly reside broadly in the process, including the use of an extruder with planetary spindles that outside the zone of the truncated toothing are equipped with conventional toothing and/or transversal mixing toothing and/or back-cut toothing.

Yet another feature or aspect of an exemplification is believed at the time of the filing of this patent application to possibly reside broadly in the process, including the use of an extruder, wherein the planetary spindles of the feed part equipped with a transport spindle toothing are equipped, at least at the ends, with conventional toothing.

Still another feature or aspect of an exemplification is believed at the time of the filing of this patent application to possibly reside broadly in an extruder according to the present application, wherein the planetary spindles with a transport spindle toothing in the feed part are combined with differently toothed planetary spindles.

A further feature or aspect of an exemplification is believed at the time of the filing of this patent application to possibly reside broadly in the process, including the use of an extruder, wherein the percentage of the planetary spindles with transport spindle toothing is at least 50%, in one possible exemplification at least 70% and in another possible exemplification at least 70% of the planetary spindle finishes on the planetary roller extruder section that forms the inlet feed and/or the planetary spindles with transport spindle toothing are evenly distributed in the planetary spindle finishes.

One feature or aspect of an exemplification is believed at the time of the filing of this patent application to possibly reside broadly in the process, including the use of an extruder with a tooth truncation in the inlet zone, wherein the teeth of the toothing of the housing have been truncated at most into the tooth base, in one possible exemplification truncated by at most 90% of the original tooth height, in another possible exemplification has been truncated by at most 80% of the original tooth height, wherein the truncation decreases with increasing distance from the inlet opening.

Another feature or aspect of an exemplification is believed at the time of the filing of this patent application to possibly reside broadly in the process, including the use of an extruder, wherein the truncation in the inlet zone extends over at least one tenth, in one possible exemplification over at least one fifth, in another possible exemplification over at least ½ and in another possible exemplification over at least ¾ of the periphery of the pitch circle of the inner toothing of the housing.

Yet another feature or aspect of an exemplification is believed at the time of the filing of this patent application to possibly reside broadly in the process, including the use of an extruder, wherein the truncated teeth are provided with tooth flanks, whose slant is less than the tooth flanks of the teeth in the un-truncated zone and/or the truncated teeth are provided with a curved top.

Still another feature or aspect of an exemplification is believed at the time of the filing of this patent application to possibly reside broadly in the process, including the use of an extruder, wherein the center axis of the inlet opening intersects the pitch diameter of the inner toothing of the housing as a secant or runs as a tangent to the pitch circle of the inner toothing of the housing or runs at a distance from the pitch circle of the inner toothing of the housing, wherein the distance is at most equal to the thickness of the housing cover.

A further feature or aspect of an exemplification is believed at the time of the filing of this patent application to possibly reside broadly in the process, including the use of an extruder with an inlet opening that as a result of the offset protrudes towards the interior of the feed part and merges with a slope into the wall of the feed part, wherein the slope in one possible exemplification includes an angle of up to 30°, in another possible exemplification an angle of up to 45° and in yet another possible exemplification an angle of up to 60° between itself and the horizontal.

Another feature or aspect of an exemplification is believed at the time of the filing of this patent application to possibly reside broadly in the process, wherein in order to facilitate the start of the devulcanisation a partial amount of the desired throughput is initially fed into the extruder, and the added amount is increased after the devulcanisation process has stabilized.

Yet another feature or aspect of an exemplification is believed at the time of the filing of this patent application to possibly reside broadly in the process, wherein the particles are added stepwise through inlet openings that are spaced apart.

Still another feature or aspect of an exemplification is believed at the time of the filing of this patent application to possibly reside broadly in the process, wherein particles are fed mechanically by means of a crammer feeder at at least one downstream inlet opening.

A further feature or aspect of an exemplification is believed at the time of the filing of this patent application to possibly reside broadly in the process, wherein a twin-screw extruder is used as the crammer feeder.

The components disclosed in the patents, patent applications, patent publications, and other documents disclosed or incorporated by reference herein, may possibly be used in possible exemplifications of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one exemplification of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various exemplifications may be used with at least one exemplification or all of the exemplifications, if more than one exemplification is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications, patent publications, and other documents cited herein, and in the Declaration attached hereto, are hereby incorporated by reference as if set forth in their entirety herein except for the exceptions indicated herein.

The summary is believed, at the time of the filing of this patent application, to adequately summarize this patent application.

However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, patent applications, patent publications, and other documents which are included in this application and which are referred to in paragraphs which state "Some examples of . . . which may possibly be used in at least one possible exemplification of the present application . . . " may possibly not be used or useable in any one or more exemplifications of the application.

The sentence immediately above relates to patents, patent applications, patent publications, and other documents either incorporated by reference or not incorporated by reference.

All of the patents, patent applications, patent publications, and other documents, except for the exceptions indicated herein, are hereby incorporated by reference as if set forth in their entirety herein except for the exceptions indicated herein, as follows: DE 60004885 T2, having the title "MODIFIER FOR DEVULCANIZATION OF CURED ELASTOMERS, MAINLY VULCANIZED RUBBER AND METHOD FOR DEVULCANIZATION BY MEANS OF THIS MODIFIER", published on Jun. 3, 2004; DE 909041, having the title "Verfahren zur Herstellung von Regeneraten aus vulkanisiertem Altkautschuk", published on Apr. 12, 1954; DE 60008279 T2, having the title "METHOD FOR DEVULCANIZING RUBBER WITH AN AMINE", published on Dec. 16, 2004; DE 60215210 T2, having the title "PROCESS FOR REGENERATION OF RUBBER FROM SCRAP", published on Aug. 23, 2007; DE 60306089 T2, having the title "Devulcanization of cured rubber", published on Dec. 28, 2006; DE 60120804 T2, having the title "Reclaimed rubber and process for producing the same", published on Jan. 11, 2007; WO2011/091966, having the title "DEVULCANIZATION OF SCRAP RUBBER", published on Aug. 4, 2011; DE 69329245 T2, having the title "Continuous ultrasonic devulcanization of valcanized elastomers", published on Mar. 29, 2001; DE 69724239 T2, having the title "Devulkanisiertes Kautschuk, Verfahren zu deren Herstellung und Verfahren zur Herstellung von geformten regenerierten Gummigegenständen daraus", published on Jun. 9, 2004; DE 102009019846, having the title "Granulatzusammensetzung und Verfahren zu deren Herstellung", published on Nov. 11, 2010; DE 102009013839, having the title "Planetary-gear extruder for producing mixtures of e.g. plastics utilized for pipe, has planetary gear spindle extending over extruder section housing, where length of piece of spindle is five times of pitch diameter of tooth system of piece", published on Sep. 23, 2010; DE102008063036, having the title "Method for producing a thermally reactive pressure sensitive adhesive mass", published on Jul. 1, 2010; DE 102008018686, having the title "Extrusion unit for extruding property of multiple volatile components, such as plastic, has dosage unit, particularly in planet roller building method, modular structure and planet roller module", published on Oct. 15, 2009; DE 102007058174, having the title "Extruder i.e. planet roller extruder, for processing and treatment of e.g. plastics, has planet spindles combed with central spindle, and nozzle arranged in direction of melt before storage, where adjustment of nozzle gap takes place", published on Jun. 4, 2009; DE102007050466, having the title "Extruder e.g. planetary-gear extruder, for use during processing of plastics, has sleeve-shaped or ring-shaped sections that are hold on carrier, where carrier is interlocked with sections and carrier in connection with extrusion drive", published on Apr. 23, 2009; DE 102007041486, having the title "Extruder e.g. snail extruder, for use in food and chemical industries, has central spindle of roller module projecting into opening of snail of snail module and deformed with snail, where spindle projects into snail over angular gear teeth", published on May 15, 2008; DE 102007040645, having the title "Extruder i.e. planetary gear extruder, for use during extrusion of plastic i.e. polyethylene terephthalate, has degasifying vent that is formed in housing, where degassing opening runs oblong and diagonal to longitudinal axis of extruder", published on Aug. 27, 2007; DE 10 2004 048 440, having the title "Planetary roller extruder, comprises a central spindle, a planetary spindle and a housing box with inner teeth", published on Jun. 9, 2005; U.S. Pat. No. 7,476,416, having the title "Process for preparing adhesive using planetary extruder", issued on Jan. 13, 2009; EP 702739, having the title "POST DEVICE", published on Mar. 27, 1996; DE102015010460, having the title "DEVULCANIZATION OF WASTE RUBBER IN A PLANET ROLLER EXTRUDER", published on Mar. 2, 2017; DE 60124269, having the title "CROSS-LINKED FOAMED PRESSURE SENSITIVE ADHESIVE AND METHOD FOR PREPARING THE SAME", published on May 31, 2007; DE 3738335, having the title "Thermoplastic compositions", published on May 26, 1988; DD 141975, having the title "VERFAHREN UND VORRICHTUNG ZUR KONTINUIERLICHEN HERSTELLUNG VON POLYURETHAN-PRODUKTEN", published on Jun. 4, 1980; DE 1964834, having the title "Polyurethane elastomers mfr by direct reac-tion in extruder", published on Jul. 1, 1971; U.S. Pat. No. 3,233,025, having the title "Method of making polyurethanes", published on Feb. 1, 1966; DE 2059570, having the title "Kontinuierliches Einschritt-Herstellungsverfahren fuer ein thermoplastisches, unporiges Polyurethan", published on Jun. 9, 1971; DE 2447368, having the title "Thermoplastic polyurethane elastomers prepn.—by introducing components into extruder inlet zone, and maintaining definite temp. profile in extruder", published on Apr. 8, 1976; EP 1167017, having the title "PACKAGING FILM WITH IMPROVED PACKAGING TIGHTNESS, PROCESS OF MAKING AND USE AS PACKAGING MATERIAL", published on Jan. 2, 2002; DE 69829695, having the title "ELASTOMER PROCESSING SYSTEM FOR CHEWING GUM", published on Mar. 23, 2006; U.S. Pat. No. 5,135,760, having the title "Reducing sugar lumps by dual gum base injection in a corotating twin screw extruder", published on Aug. 4, 1992; U.S. Pat. No. 5,045,325, having the title "Continuous production of chewing gum using corotating twin screw extruder", published on Sep. 3, 1991; and U.S. Pat. No. 4,555,366, having the title "Non-emissive, flame-retardant coating compositions", published on Nov. 26, 1985.

The corresponding foreign and international patent publication applications, namely, Federal Republic of Germany Patent Application No. 10 2016 007 290.3, filed on Jun. 16, 2016, having inventor Harald RUST, and DE-OS 10 2016 007 290.3 and DE-PS 10 2016 007 290.3, is hereby incorporated by reference as if set forth in their entirety herein, except for the exceptions indicated herein, for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications, patent publications, and other documents, except for the exceptions indicated herein, are hereby incorporated by reference as if set forth in their entirety herein except for the exceptions indicated herein.

The purpose of incorporating the corresponding foreign equivalent patent application, that is, German Patent Application 10 2016 007 290.3, is solely for the purposes of providing a basis of correction of any wording in the pages of the present application, which may have been mistranslated or misinterpreted by the translator, and to provide additional information relating to technical features of one or more exemplifications, which information may not be completely disclosed in the wording in the pages of this application.

Statements made in the original foreign patent application DE 10 2016 007 290.3 from which this patent application claims priority which do not have to do with the correction of the translation in this patent application are not to be included in this patent application in the incorporation by reference.

Any statements about admissions of prior art in the original foreign patent application DE 10 2016 007 290.3 are not to be included in this patent application in the incorporation by reference, since the laws relating to prior art in non-U.S. Patent Offices and courts may be substantially different from the Patent Laws of the United States.

All of the references and documents cited in any of the patents, patent applications, patent publications, and other documents cited herein, except for the exceptions indicated herein, are hereby incorporated by reference as if set forth in their entirety herein except for the exceptions indicated herein. All of the patents, patent applications, patent publications, and other documents cited herein, referred to in the immediately preceding sentence, include all of the patents, patent applications, patent publications, and other documents cited anywhere in the present application.

Words relating to the opinions and judgments of the author of all patents, patent applications, patent publications, and other documents cited herein and not directly relating to the technical details of the description of the exemplifications therein are not incorporated by reference.

The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more exemplifications of the patents, patent applications, patent publications, and other documents, are not considered to be incorporated by reference herein for any of the patents, patent applications, patent publications, and other documents cited herein.

The description of the exemplification or exemplifications is believed, at the time of the filing of this patent application, to adequately describe the exemplification or exemplifications of this patent application. However, portions of the description of the exemplification or exemplifications may not be completely applicable to the claims as originally filed in this patent application, as amended during prosecution of this patent application, and as ultimately allowed in any patent issuing from this patent application. Therefore, any statements made relating to the exemplification or exemplifications are not intended to limit the claims in any manner and should not be interpreted as limiting the claims in any manner.

The details in the patents, patent applications, patent publications, and other documents cited herein may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the exemplification or exemplifications, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. § 1.72(b). As stated in 37 C.F.R. § 1.72(b):

> A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The exemplifications of the invention described herein above in the context of the preferred exemplifications are not to be taken as limiting the exemplifications of the invention to all of the provided details thereof, since modifications and variations thereof may be made without departing from the spirit and scope of the exemplifications of the invention.

What is claimed is:

1. A method of devulcanizing crosslinked rubber and crosslinked elastomers using a planetary roller extruder, which planetary roller extruder comprises: a central spindle, at least one group of planetary spindles, a housing, and a feed part, said method comprising the steps of:

feeding vulcanized rubber and/or elastomers through said feed part and into said housing;

operating said planetary roller extruder by rotating said central spindle about its rotational axis, and thereby both rotating said at least one group of planetary spindles about each of their rotational axes and revolving said at least one group of planetary spindles about said central spindle;

generating mechanical and thermal stress on said vulcanized rubber and/or elastomers by kneading and/or crushing of said vulcanized rubber and/or elastomers by said central spindle and said at least one group of planetary spindles;

breaking or destroying the molecular chains or bonds of said vulcanized rubber and/or elastomers by said mechanical and thermal stress;

said step of feeding comprising at least one of (A) and (B):
(A) adding particles of said vulcanized rubber and/or elastomers eccentrically to the center of the planetary roller extruder module between the planetary spindles; and
(B) mechanically pressing particles of said vulcanized rubber and/or elastomers between the planetary spindles with a crammer feeder.

2. The method according to claim 1, wherein:
said feed part comprises a feed opening configured to guide particles of said vulcanized rubber and/or elastomers from a hopper into the interior of said housing; and
said feed opening is offset from said central spindle such that a central axis of said feed opening is not oriented radially with respect to a central rotational axis of said central spindle.

3. The method according to claim 2, wherein:
said housing comprises an inner toothed portion configured to engage with said at least one group of planetary spindles, which inner toothed portion comprises a toothing formed from said housing or a toothed lining connected to said housing; and
at least one of (A), (B), and (C):
(A) the offset is at least equal to a quarter of the pitch diameter of said inner toothed portion;
(B) the offset is smaller than half of the pitch diameter of said inner toothed portion; and
(C) the offset is greater than half of the root diameter of the central spindle toothing and smaller than half the root diameter of said inner toothed portion.

4. The method according to claim 3, wherein:
said feed opening comprises a tapered portion at or adjacent the transition into said housing of said planetary roller extruder;
said tapered portion is sloped to lie on or offset from a tangent to a pitch diameter of said inner toothed portion, which offset from the tangent is one of:
equal to the diameter of the planetary spindles,
equal to half the diameter of the planetary spindles, and
equal to a quarter of the diameter of the planetary spindles; and
said tapered portion is sloped at angle with respect to the horizontal, which angle is one of:
at least 30°,
at least 45°, and
at least 60°.

5. The method according to claim 4, wherein the planetary spindles in the inlet zone of the material from the material feed, at least for pressureless material feeds, are designed at least partly as transport spindles and/or whose inner toothing of the housing is truncated to form an inlet funnel in the toothing, at least in the zone that adjoins the inlet opening of the housing cover, and extends in the direction of rotation of the central spindle.

6. The method according to claim 5, wherein the inlet zone is the annular surface on the housing cover, in which the opening for the material feed lies:

plus/minus with an annular surface width deviation of 50%,
plus/minus with an annular surface width deviation of 30%, and
plus/minus with an annular surface width deviation of 10%.

7. The method according to claim 6, wherein said planetary spindles that are outside the zone of the truncated toothing are equipped with conventional toothing and/or transversal mixing toothing and/or back-cut toothing.

8. The method according to claim 7, wherein the planetary spindles of the feed part equipped with a transport spindle toothing are equipped, at least at the ends, with conventional toothing.

9. The method according to claim 8, wherein the planetary spindles with a transport spindle toothing in the feed part are combined with differently toothed planetary spindles.

10. The method according to claim 9, wherein the percentage of the planetary spindles with transport spindle toothing is at least 50%, or is at least 70% and or is at least 70% of the planetary spindle finishes on the planetary roller extruder section that forms the inlet feed, and/or the planetary spindles with transport spindle toothing are evenly distributed in the planetary spindle finishes.

11. The method according to claim 10, wherein the planetary roller extruder comprises a tooth truncation in the inlet zone, wherein the teeth of the toothing of the housing have been truncated at most into the tooth base, which truncation is at most 90% of the original tooth height, or is at most 80% of the original tooth height, wherein the truncation decreases with increasing distance from the inlet opening.

12. The method according to claim 11, wherein the truncation in the inlet zone extends one of:
over at least one-tenth of the periphery of the pitch circle of the inner toothing of the housing,
over at least one-fifth of the periphery of the pitch circle of the inner toothing of the housing,
over at least one-half of the periphery of the pitch circle of the inner toothing of the housing, and
over at least three-fourths of the periphery of the pitch circle of the inner toothing of the housing.

13. The method according to claim 12, wherein the truncated teeth are provided with tooth flanks, whose slant is less than the tooth flanks of the teeth in the un-truncated zone and/or the truncated teeth are provided with a curved top.

14. The method according to claim 13, wherein the center axis of the inlet opening intersects the pitch diameter of the inner toothing of the housing as a secant or runs as a tangent to the pitch circle of the inner toothing of the housing or runs at a distance from the pitch circle of the inner toothing of the housing, wherein the distance is at most equal to the thickness of the housing cover.

15. The method according to claim 14, wherein in order to facilitate the start of the devulcanization, a partial amount of the desired throughput is initially fed into the extruder, and the added amount is increased after the devulcanization process has stabilized.

16. The method according to claim 15, wherein:
the particles are added stepwise through inlet openings that are spaced apart;
particles are fed mechanically by means of a crammer feeder at at least one downstream inlet opening; and
a twin-screw extruder is used as the crammer feeder.

17. A planetary roller extruder configured to devulcanize crosslinked rubber and crosslinked elastomers, said planetary roller extruder comprising:

a central spindle;
at least one group of planetary spindles;
said central spindle being configured to be rotated about its rotational axis, and thereby both rotate said at least one group of planetary spindles about each of their rotational axes and revolve said at least one group of planetary spindles about said central spindle;
a housing configured to house said central spindle and said at least one group of planetary spindles;
a feed part being configured to feed vulcanized rubber and/or elastomers into said housing;
said central spindle and said at least one group of planetary spindles being configured to generate mechanical and thermal stress on said vulcanized rubber and/or elastomers by kneading and/or crushing of said vulcanized rubber and/or elastomers, which mechanical and thermal stress being sufficient to break or destroy the molecular chains or bonds of said vulcanized rubber and/or elastomers;
said feed part comprising a feed opening configured to guide particles of said vulcanized rubber and/or elastomers from a hopper into the interior of said housing; and
at least one of (A) and (B):
 (A) said feed opening being offset from said central spindle such that a central axis of said feed opening is not oriented radially with respect to a central rotational axis of said central spindle; and
 (B) said feed part comprising a crammer feeder configured to mechanically press particles of said vulcanized rubber and/or elastomers through said feed opening and between said planetary spindles.

18. The planetary roller extruder according to claim 17, wherein:
said housing comprises an inner toothed portion configured to engage with said at least one group of planetary spindles, which inner toothed portion comprises a toothing formed from said housing or a toothed lining connected to said housing; and
at least one of (A), (B), and (C):
 (A) the offset is at least equal to a quarter of the pitch diameter of said inner toothed portion;
 (B) the offset is smaller than half of the pitch diameter of said inner toothed portion; and
 (C) the offset is greater than half of the root diameter of the central spindle toothing and smaller than half the root diameter of said inner toothed portion.

19. The planetary roller extruder according to claim 18, wherein:
said feed opening comprises a tapered portion at or adjacent the transition into said housing of said planetary roller extruder;
said tapered portion is sloped to lie on or offset from a tangent to a pitch diameter of said inner toothed portion, which offset from the tangent is one of:
 equal to the diameter of the planetary spindles,
 equal to half the diameter of the planetary spindles, and
 equal to a quarter of the diameter of the planetary spindles; and
said tapered portion is sloped at angle with respect to the horizontal, which angle is one of:
 at least 30°,
 at least 45°, and
 at least 60°.

20. The planetary roller extruder according to claim 19, wherein the planetary spindles in the inlet zone of the material from the material feed, at least for pressureless material feeds, are designed at least partly as transport spindles and/or whose inner toothing of the housing is truncated to form an inlet funnel in the toothing, at least in the zone that adjoins the inlet opening of the housing cover, and extends in the direction of rotation of the central spindle.

* * * * *